United States Patent
Hatanaka et al.

(10) Patent No.: US 9,442,232 B2
(45) Date of Patent: Sep. 13, 2016

(54) OPTICALLY ANISOTROPIC SHEET

(71) Applicant: SUMITOMO CHEMICAL COMPANY, LIMITED, Chuo-ku, Tokyo (JP)

(72) Inventors: Nobuyuki Hatanaka, Osaka (JP); Tadahiro Kobayashi, Osaka (JP); Akira Yokota, Osaka (JP); Tatsuaki Kasai, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/454,379

(22) Filed: Aug. 7, 2014

(65) Prior Publication Data

US 2015/0062505 A1 Mar. 5, 2015

(30) Foreign Application Priority Data

Aug. 9, 2013 (JP) ................. 2013-165937
Sep. 10, 2013 (JP) ................. 2013-187031
Jan. 31, 2014 (JP) ................. 2014-017294

(51) Int. Cl.
*G02B 5/30* (2006.01)
*B32B 17/10* (2006.01)
*G02F 1/13363* (2006.01)
*C09J 7/02* (2006.01)

(52) U.S. Cl.
CPC ....... *G02B 5/3016* (2013.01); *B32B 17/10504* (2013.01); *C09J 7/0296* (2013.01); *G02F 1/133634* (2013.01); *C09J 2201/606* (2013.01); *C09J 2201/622* (2013.01); *C09J 2203/318* (2013.01); *G02F 2202/28* (2013.01); *G02F 2202/40* (2013.01); *G02F 2413/11* (2013.01)

(58) Field of Classification Search
CPC .......... G02B 5/3016; G02F 1/133634; G02F 2202/40; G02F 2413/11; G02F 2202/28; B32B 17/10504
See application file for complete search history.

(56) References Cited

U.S. PATENT DOCUMENTS 3,942,871 A * 3/1976 Saeva .................. G02B 5/3016 349/165
5,730,903 A 3/1998 Okazaki
5,780,629 A 7/1998 Etzbach et al.
(Continued)

FOREIGN PATENT DOCUMENTS

JP 50-83482 7/1975
JP 2-113920 A 4/1990
(Continued)

OTHER PUBLICATIONS

Communication dated Jul. 28, 2015 from the Japanese Patent Office in counterpart application No. 2014-161210.
(Continued)

*Primary Examiner* — Anne Hines
(74) *Attorney, Agent, or Firm* — Sughrue Mion, PLLC

(57) ABSTRACT

Provided is an optically anisotropic sheet that gives a thin optically anisotropic film that can be transferred to a display device. The optically anisotropic sheet includes a substrate, a liquid crystal cured film, and a sticky adhesive layer in this order. The liquid crystal cured film is a film that has a thickness of 5 μm or less and is cured with a polymerizable liquid crystal compound aligned. The sticking force (F1) between the liquid crystal cured film and the sticky adhesive layer is greater than the substrate sticking force (F4).

28 Claims, 2 Drawing Sheets

(56) References Cited

U.S. PATENT DOCUMENTS

| | | |
|---|---|---|
| 6,217,792 B1 | 4/2001 | Parri et al. |
| 6,400,433 B1 | 6/2002 | Arakawa et al. |
| 6,723,395 B2 | 4/2004 | May et al. |
| 7,765,330 B2 | 7/2010 | Kim |
| 8,383,212 B2 | 2/2013 | Obata et al. |
| 8,545,970 B2 | 10/2013 | Doi et al. |
| 2003/0031845 A1* | 2/2003 | Umeya ............... B32B 7/02 428/212 |
| 2013/0083277 A1 | 4/2013 | Yamamoto et al. |

FOREIGN PATENT DOCUMENTS

| | | | |
|---|---|---|---|
| JP | 6-34976 A | 2/1994 |
| JP | 7-30637 A | 1/1995 |
| JP | 7-258170 A | 10/1995 |
| JP | 7-309807 A | 11/1995 |
| JP | 8-231470 A | 9/1996 |
| JP | 9-506088 A | 6/1997 |
| JP | 10-68816 A | 3/1998 |
| JP | 10-90521 A | 4/1998 |
| JP | 2000-206331 A | 7/2000 |
| JP | 2000-515496 A | 11/2000 |
| JP | 2001-4837 A | 1/2001 |
| JP | 2001-21720 A | 1/2001 |
| JP | 2003-137887 A | 5/2003 |
| JP | 2007-169178 A | 7/2007 |
| JP | 2007-176870 A | 7/2007 |
| JP | 2007-269639 A | 10/2007 |
| JP | 2007-269640 A | 10/2007 |
| JP | 2008-129465 A | 6/2008 |
| JP | 2010-24438 A | 2/2010 |
| JP | 2010-31223 A | 2/2010 |
| JP | 4502119 B2 | 7/2010 |
| JP | 2010-270108 A | 12/2010 |
| JP | 2011-6360 A | 1/2011 |
| JP | 4605016 B2 | 1/2011 |
| JP | 4719156 B2 | 7/2011 |
| JP | 2011-207765 A | 10/2011 |
| JP | 2011-242743 A | 12/2011 |
| JP | 4985906 B2 | 7/2012 |
| JP | 2012-234010 A | 11/2012 |
| JP | 2013-029827 A | 2/2013 |
| JP | 2013-83955 A | 5/2013 |
| JP | 2014-071190 A | 4/2014 |
| JP | 2014-071380 A | 4/2014 |
| JP | 2014-134728 A | 7/2014 |

OTHER PUBLICATIONS

Notice of Reasons for Rejection issued Mar. 10, 2015 in corresponding Japanese Patent Application No. 2014-161210 with translation.

"Testing Methods for Optical Properties of Plastics", Japanese Industrial Standard, JIS K 7105-1981, 36 total pages.

"Adhesives—Determination of peel strength of bonded assemblies—Part 1: 90° peel", Japanese Industrial Standard, JIS K 6854-1:1999, 8 total pages.

"Liquid Crystal Device Handbook", Chapter 3, 4-3, Chiral Agents for TN and STN, p. 199, edited by Japan Society for the Promotion of Science, 142 Committee, 1989.

"Handbook of Liquid Crystals", Chapter 3.8.6. Network (Fully Cross-Linked), 6.5.1. Liquid Crystal Material, b. Polymerizable Nematic Liquid Crystal Material, edited by Ekisho Binran Henshu linkai, Maruzen, Oct. 30, 2000.

* cited by examiner

OPTICALLY ANISOTROPIC SHEET

This application claims priority from Japanese Patent Application Nos. 2013-165937 filed Aug. 9, 2013, 2013-187031 filed Sep. 10, 2013, and 2014-017294 filed Jan. 31, 2014, the contents of all of which are incorporated herein by reference in their entirety.

BACKGROUND OF THE INVENTION

1. Field of the Invention

The present invention relates to an optically anisotropic sheet.

2. Description of the Related Art

A polarizing film formed of a stretched polyvinyl alcohol is extremely brittle and needs to be sandwiched between transparent films, so there has been the problem of increased thickness (Yasozi SUZUKI, "*Ekisho-disupurei noDekirurnade*" (How Liquid Crystal Display is Made), Nikkan Kogyo Shimbun Ltd., Nov. 28, 2005).

In addition, a retardation film using a polymer film breaks during heat-stretching, so it has been difficult to reduce the thickness.

SUMMARY OF THE INVENTION

There has been a demand for an optically anisotropic sheet that gives a thin optically anisotropic film.

The present invention provides the following.

[1] An optically anisotropic sheet including a substrate, a liquid crystal cured film, and a sticky adhesive layer in this order, wherein
the liquid crystal cured film is a film that has a thickness of 5 μm or less and is cured with a polymerizable liquid crystal compound aligned, and
the sticking force (F1) between the liquid crystal cured film and the sticky adhesive layer is greater than a substrate sticking force (F4), F4 being 0.02 N/25 mm or more and less than 1 N/25 mm.

[2] An optically anisotropic sheet including a substrate, an alignment film, a liquid crystal cured film, and a sticky adhesive layer in this order, wherein
the alignment film is a film that has a thickness of 500 nm or less and is made of a polymer compound,
the liquid crystal cured film is a film that has a thickness of 3 μm or less and is cured with a polymerizable liquid crystal compound aligned in the direction horizontal to the plane of the substrate, and
the sticking force (F1) between the liquid crystal cured film and the sticky adhesive layer is greater than the sticking force (F2) between the substrate and the alignment film or the sticking force (F3) between the alignment film and the liquid crystal cured film,
F2 and F3 being 0.02 N/25 mm or more, F2 or F3 being less than 1 N/25 mm.

[3] The optically anisotropic sheet according to [2], wherein the alignment film is a photoalignment film.

[4] The optically anisotropic sheet according to any one of [1] to [3], wherein the liquid crystal cured film has wavelength dispersion characteristics that satisfy the following equations (1), (2), and (3)

$$Re(450)/Re(550) \leq 1.00 \quad (1)$$

$$1.00 \leq Re(650)/Re(550) \quad (2)$$

$$100 < Re(550) < 150 \quad (3)$$

wherein Re(450), Re(550), and Re(650) represent retardation at wavelengths of 450 nm, 550 nm, and 650 nm, respectively.

[5] The optically anisotropic sheet according to any one of [1] to [4], wherein the liquid crystal cured film has a refractive index relation expressed by the following equation (4):

$$nz > nx \approx ny \quad (4)$$

wherein nz represents a refractive index in the thickness direction, nx represents a refractive index in the direction that gives the maximum refractive index in the plane, and ny represents a refractive index in the direction that is perpendicular to the direction of nx in the plane.

[6] The optically anisotropic sheet according to any one of [1] to [3], wherein the liquid crystal cured film further contains a dichroic pigment.

[7] The optically anisotropic sheet according to [6], wherein the dichroic pigment contains three or more kinds of azo compounds.

[8] The optically anisotropic sheet according to any one of [1] to [3], wherein the liquid crystal cured film shows a Bragg peak in X-ray diffraction measurement.

[9] The optically anisotropic sheet according to any one of [1] to [8], wherein the sticky adhesive layer is a sticky adhesive layer formed from an active-energy-ray-curable adhesive.

[10] An optically anisotropic film including the optically anisotropic sheet of any one of [1] to [9] with the substrate removed.

[11] A circularly polarizing plate including a polarizing plate, a first sticky adhesive layer, a liquid crystal cured film, and a second sticky adhesive layer laminated in this order, wherein
the liquid crystal cured film is a film that has a thickness of 3 μm or less, is cured with a polymerizable liquid crystal compound aligned in the direction horizontal to the plane of the substrate, and has wavelength dispersion characteristics that satisfy the following equations (1), (2), and (3):

$$Re(450)/Re(550) \leq 1.00 \quad (1)$$

$$1.00 \leq Re(650)/Re(550) \quad (2)$$

$$100 \leq Re(550) < 150 \quad (3)$$

wherein Re(450), Re(550), and Re(650) represent retardation at wavelengths of 450 nm, 550 nm, and 650 nm, respectively.

[12] The circularly polarizing plate according to [11], further including an alignment film between the first sticky adhesive layer and the liquid crystal cured film, wherein the alignment film is a film that has a thickness of 500 nm or less and is made of a polymer compound.

[13] The circularly polarizing plate according to [11] or [12], further including an alignment film between the liquid crystal cured film and the second sticky adhesive layer, wherein the alignment film is a film that has a thickness of 500 nm or less and is made of a polymer compound.

[14] The circularly polarizing plate according to any one of [11] to [13], wherein the first sticky adhesive layer is a sticky adhesive layer formed from an active-energy-ray-curable adhesive.

[15] The circularly polarizing plate according to any one of [11] to [14], wherein the second sticky adhesive layer is a sticky adhesive layer formed from an active-energy-ray-curable adhesive.

[16] A circularly polarizing plate including a liquid crystal cured film, a sticky adhesive layer, a retardation film, and a sticky adhesive layer laminated in this order, wherein the liquid crystal cured film is a film that has a thickness of 3 µm or less, is cured with a polymerizable liquid crystal compound aligned in the direction horizontal to the plane of the substrate, and contains a dichroic pigment.

[17] The circularly polarizing plate according to [16], further including an alignment film on a surface of the liquid crystal cured film, wherein the alignment film is a film that has a thickness of 500 nm or less and is made of a polymer compound.

[18] The circularly polarizing plate according to [16] or [17], wherein the sticky adhesive layer is a sticky adhesive layer formed from an active-energy-ray-curable adhesive.

[19] A circularly polarizing plate including a first liquid crystal cured film, a first sticky adhesive layer, a second liquid crystal cured film, and a second sticky adhesive layer in this order, wherein the first liquid crystal cured film is a film that has a thickness of 3 µm or less, is cured with a polymerizable liquid crystal compound aligned in the direction horizontal to the plane of the substrate, and contains a dichroic pigment, the second liquid crystal cured film is a liquid crystal cured film that has a thickness of 3 µm or less, is cured with a polymerizable liquid crystal compound aligned in the direction horizontal to the plane of the substrate, and has wavelength dispersion characteristics that satisfy the following equations (1), (2), and (3):

$$Re(450)/Re(550) \leq 1.00 \quad (1)$$

$$1.00 \leq Re(650)/Re(550) \quad (2)$$

$$100 < Re(550) < 150 \quad (3)$$

wherein Re(450), Re(550), and Re(650) represent retardation at wavelengths of 450 nm, 550 nm, and 650 nm, respectively.

[20] The circularly polarizing plate according to [19], further including an alignment film between the first sticky adhesive layer and the second liquid crystal cured film, wherein the alignment film is a film that has a thickness of 500 nm or less and is made of a polymer compound.

[21] The circularly polarizing plate according to [19] or [20] further including an alignment film on a surface of the first liquid crystal cured film, wherein the alignment film is a film that has a thickness of 500 nm or less and is made of a polymer compound.

[22] The circularly polarizing plate according to [19], further including an alignment film on a surface of the first liquid crystal cured film and also between the sticky adhesive layer and the second liquid crystal cured film, wherein the alignment film is a film that has a thickness of 500 nm or less and is made of a polymer compound.

[23] The circularly polarizing plate according to any one of [19] to [22], wherein the first sticky adhesive layer is a sticky adhesive layer formed from an active-energy-ray-curable adhesive.

[24] The circularly polarizing plate according to any one of [19] to [23], wherein the second sticky adhesive layer is a sticky adhesive layer formed from an active-energy-ray-curable adhesive.

[25] A display device equipped with an optically anisotropic film, including the circularly polarizing plate of any one of [11] to [24].

[26] A method for producing a display device equipped with an optically anisotropic film, including attaching the optically anisotropic sheet of anyone of [1] to [9] to a display surface of a display device via the sticky adhesive layer, and then removing the substrate of the optically anisotropic sheet.

[27] A method for producing a display device equipped with an optically anisotropic film, including attaching the optically anisotropic sheet of [4] to a display surface of a display device via the sticky adhesive layer, then removing the substrate of the optically anisotropic sheet, further attaching the optically anisotropic sheet with a sticky adhesive of any one of [6] to [8] thereonto via the sticky adhesive layer, and then removing the substrate of the optically anisotropic sheet.

The present invention enables the provision of an optically anisotropic sheet that gives a thin optically anisotropic film that can be transferred to a display device.

DETAILED DESCRIPTION OF THE PREFERRED EMBODIMENTS

Figure 1:
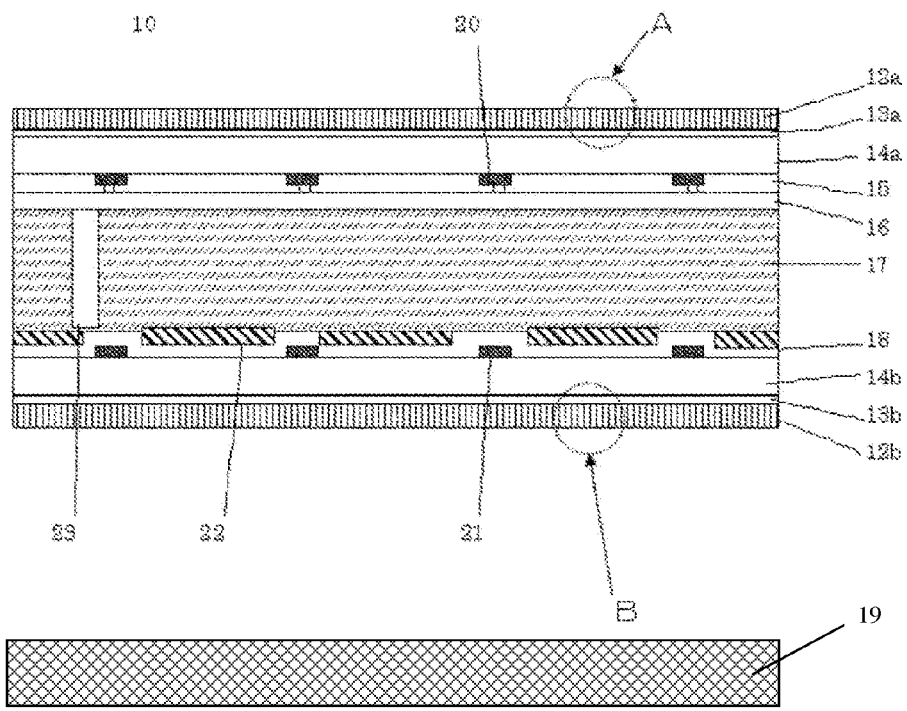
FIG. 1 is a schematic diagram of a liquid crystal display including an optically anisotropic film obtained from the optically anisotropic sheet of the present invention.

The optically anisotropic sheet of the present invention (hereinafter sometimes referred to as present optically anisotropic sheet) has a substrate, a liquid crystal cured film, and a sticky adhesive layer in this order, and preferably has a substrate, an alignment film, a liquid crystal cured film, and a sticky adhesive layer in this order. An optically anisotropic film obtained by removing the substrate from the present optically anisotropic sheet (hereinafter sometimes referred to as present optically anisotropic, film) is suitable for use as a polarizing film or a retardation film in a display device such as a liquid crystal display device and an organic EL display device.

The substrate sticking force (F4) herein is the force that the present optically anisotropic sheet has, which is required for the separation of the substrate from the liquid crystal cured film. It specifically refers to the lowest sticking force among the sticking force between the substrate and the liquid crystal cured film, the sticking force (F2) between the substrate and the alignment film, and the sticking force (53) between the alignment film and the liquid crystal cured film.

<Substrate>

The substrate may be a glass substrate or a plastic substrate, and is preferably a plastic substrate. Examples of plastics for forming a plastic substrate include polyolefins such as polyethylene, polypropylene, and norbornene polymers; cyclic olefin resins; polyvinyl alcohol; polyethylene terephthalate; polymethacrylic acid ester; polyacrylic acid ester; cellulose esters such as triacetyl cellulose, diacetyl cellulose, and cellulose acetate propionate; polyethylene naphthalate; polycarbonate; polysulfone; polyether sulfone; polyether ketone; and polyphenylene sulfide and polyphenylene oxide. Preferred examples are cellulose esters, cyclicolefin resins, polycarbonate, polyethylene terephthalate, or polymethacrylic acid ester.

Cellulose esters have the hydroxyl groups of cellulose at least partially esterified, and they are easily available in the market. In addition, cellulose ester substrates are also easily available in the market. Examples of commercially available cellulose ester substrates include "Fuji TAC film" (Fuji Photo Film Co., Ltd.); and "KC8UX2M", and "KC4UY" (Konica Minolta Opto Products Co., Ltd.).

Cyclic olefin resins are formed of, for example, polymers or copolymers of cyclic olefins (cyclic olefin resins), such as norbornene and polycyclic norbornenemonomers. Such a cyclic olefin resin may partially have an opened ring. In addition, it may also be obtained by hydrogenating a cyclic olefin resin having an opened ring. Further, in terms of not significantly damaging transparency or not significantly increasing hygroscopicity, the cyclic olefin resin may also be a copolymer of a cyclic olefin and a linear olefin or a vinylated aromatic compound (styrene, etc.), for example. In addition, the cyclic olefin resin may also have a polar group introduced into the molecule.

In the case where the cyclic olefin resin is a copolymer of a cyclic olefin and an aromatic compound having as linear olefin or a vinyl group, the proportion of structural units derived from the cyclic olefin is usually within a range of 50 mol % or less, preferably 15 to 50 mol %, based on the entire structural units of the copolymer. Examples of linear olefins include ethylene and propylene, and examples of aromatic compounds having a vinyl group include styrene, α-methylstyrene, and alkylated styrenes. In the case where the cyclic olefin resin is a ternary copolymer of a cyclic olefin, a linear olefin, and an aromatic compound having a vinyl group, the proportion of structural units derived from the linear olefin is usually 5 to 80 mol % based on the entire structural units of the copolymer, and the proportion of structural units derived from the aromatic compound having a vinyl group is usually 5 to 80 mol % based on the entire structural units of the copolymer. Such a ternary copolymer is advantageous in that in its production, the usage of expensive cyclic olefin can be relatively reduced.

Cyclic olefin resins are easily available in the market. Examples of commercially available cyclic olefin resins include "Topas"® [Ticona Corporation (Germany)], "ARTON"® [JSR Corporation], "ZEONOR"® [Zeon Corporation], "ZEONEX"® [Zeon Corporation], and "APEL"® [manufactured by Mitsui Chemicals, Inc.]. Such a cyclic olefin resin can be formed into a film by a known technique, such as solvent casting or melt extrusion, and used as a substrate. In addition, it is also possible to use a commercially available cyclic olefin resin substrate. Examples of commercially available cyclic olefin resin substrates include "ESCENA"® [Sekisui Chemical Co., Ltd.], "SCA40"® [Sekisui Chemical Co., Ltd.], "ZEONOR Film"® [Optes Co., Ltd.], and "ARTON Film"® [JSR Corporation].

With respect to the thickness of the substrate, a thinner substrate is more preferable in terms of weight allowing for practical handling. However, when the substrate is too thin, the strength tends to decrease, resulting in poor workability. The thickness of the substrate is usually 5 to 300 μm, and preferably 20 to 200 μm.

The substrate may be surface-treated. The surface treatment method may be a method in which the surface of the substrate is corona- or plasma-treated under vacuum or atmospheric pressure, a method in which the substrate surface is laser-treated, a method in which the substrate surface is ozone-treated, a method in which the substrate surface is saponified, a method in which the substrate surface is flame-treated, a method in which the substrate surface is primer-treated by applying a coupling agent thereto, a graft polymerization method in which a reactive monomer or a polymer having reactivity is attached to the substrate surface, and then the surface is exposed to radiation, plasma, or ultraviolet radiation to cause a reaction, or the like. The method in which the surface of the substrate is corona- or plasma-treated under vacuum or atmospheric pressure is preferable.

Examples of methods for surface-treating the substrate with corona or plasma include:

a method in which the substrate is placed between opposed electrodes under a near-atmospheric pressure, and corona or plasma is generated to surface-treat the substrate;

a method in which a gas is passed between opposed electrodes to convert the gas into a plasma gas between the electrodes, and the plasma gas is blown to the substrate; and a method in which glow discharge plasma is generated under low-pressure conditions to surface-treat the substrate.

Among them, the method in which the substrate is placed between opposed electrodes under a near-atmospheric pressure, and corona or plasma is generated to surface-treat the substrate, and the method in which a gas is passed between opposed electrodes to convert the gas into a plasma gas between the electrodes, and the plasma gas is blown to the substrate, are preferable. Such a surface treatment with corona or plasma is usually performed by a commercially available surface treatment device.

When the substrate has a functional group that forms a chemical bond with the alignment film or the liquid crystal cured film on the surface thereof, the sticking force (F2) between the substrate and the alignment film or the sticking force between the substrate and the liquid crystal cured film tends to increase. Therefore, in order for the sticking force between the substrate and the liquid crystal cured film and the sticking force (F2) between the substrate and the alignment film to be less than 1 N/25 mm, it is preferable that the substrate has fewer surface functional groups, and it is also preferable that the substrate has not been surface-treated to form a functional group on the surface thereof. However, when the number of surface functional groups is too small, the sticking force between the substrate and the liquid crystal cured film or F2 may be 0.02 N/25 mm or less. Therefore, the substrate and the method for surface-treating the substrate should be selected to give a specific sticking force.

<Alignment Film>

The alignment film in the present invention is a film that has a thickness of 500 nm or less and is made of a polymer compound. The alignment film has an alignment regulation force that aligns liquid crystals in a polymerizable liquid crystal compound in the desired direction.

The alignment film facilitates liquid crystal alignment in a polymerizable liquid crystal compound. The state of liquid crystal alignment, such as horizontal alignment, perpendicular alignment, hybrid alignment, or inclined alignment, varies depending on the properties of the alignment film and the polymerizable liquid crystal compound, and any combination can be selected. For example, when the alignment film is a material that develops horizontal alignment with its alignment regulation force, the polymerizable liquid crystal compound can form horizontal alignment or hybrid alignment, while when it is a material that develops perpendicular alignment, the polymerizable liquid crystal compound can form perpendicular alignment or inclined alignment. The expression "horizontal", "perpendicular", etc., refers to the direction of the long axis of an aligned polymerizable liquid crystal compound relative to the plane of the liquid crystal cured film. For example, perpendicular alignment means that the aligned polymerizable liquid crystal compound has its long axis in the direction perpendicular to the plane of the liquid crystal cured film. "Perpendicular" herein means an angle of 90°±20° relative to the plane of the liquid crystal cured film.

In the case where the alignment film layer is made of an alignable polymer, the alignment regulation force can be arbitrarily adjusted by the surface conditions or rubbing conditions, while in case where it is made of a photoalignable polymer, the alignment regulation force can be arbitrarily adjusted by the conditions of exposure to polarized light, etc. In addition, the liquid crystal alignment can also be controlled by the selection of the physical properties of the polymerizable liquid crystal compound, such as surface tension and liquid crystallinity.

It is preferable that the alignment film formed between the substrate and the liquid crystal cured film is insoluble in the solvent used in the formation of the liquid crystal cured film on the alignment film and has heat resistance in a heating treatment for the removal of the solvent or the alignment of liquid crystals. The alignment film may be an alignment film made of an alignable polymer, a photoalignment film, a groove-alignment film, or the like, and is preferably a photoalignment film. A photoalignment film does not require a physical alignment treatment such as rubbing, and the sticking force tends to increase, easily achieving the F2 or F3 of 0.02 N/25 mm or more.

The thickness of the alignment film is usually within a range of 10 nm to 500 nm, and preferably within a range of 10 nm to 100 nm.

Examples of alignable polymers include polyamides and gelatins having an amide bond in the molecule, polyimides having an imide bond in the molecule, polyamic acids which are hydrolysates thereof, polyvinyl alcohol, alkyl-modified polyvinyl alcohols, polyacrylamide, polyoxazol, polyethyleneimine, polystyrene, polyvinylpyrrolidone, polyacrylic acid, and polyacrylic acid esters. Among them, polyvinyl alcohol is preferable. These alignable polymers may be used alone or in combination.

An alignment film made of an alignable polymer is usually obtained by applying a composition prepared by dissolving an alignable polymer in a solvent (hereinafter sometimes referred to as alignable polymer composition) to the substrate, and then removing the solvent, or by applying the alignable polymer composition to the substrate, and then removing the solvent, followed by rubbing (rubbing method).

Examples of solvents include water; alcoholic solvents such as methanol, ethanol, ethylene glycol, isopropyl alcohol, propylene glycol, methyl cellosolve, butyl cellosolve, and propylene glycol monomethyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; aliphatic hydrocarbon solvents such as pentane, hexane, and heptane; aromatic hydrocarbon solvents such as toluene and xylene; nitrile solvents such as acetonitrile; ether solvents such as tetrahydrofuran and dimethxyethane; and chlorinated hydrocarbon solvents such as chloroform and chlorobenzene. These solvents may be used alone or in combination.

The concentration of the alignable polymer in the alignable polymer composition should be within the range where the alignable polymer material can completely dissolve in the solvent, and is preferably 0.1 to 20%, still more preferably 0.1 to 10%, as solids content relative to the solution.

As the alignable polymer composition, a commercially available alignment film material can be directly used. Examples of commercially available alignment film materials include SUNEVER® (manufactured by Nissan Chemical Industries, Ltd.) and OPTMER® (manufactured by JSR Corporation).

The method for applying the alignable polymer composition to the substrate may be a coating method such as a spin coating method, an extrusion method, a gravure coating method, a die coating method, a bar coating method, or an applicator method, a printing method such as a flexo method, or a like known method. In the case where the present optically anisotrojoic sheet is produced by the below-mentioned, roll-to-roll continuous production method, the application method is usually a gravure coating method, a die coating method, or a printing method such as a flexo method.

As a result of the removal of the solvent contained in the alignable polymer composition, a dry film of the alignable polymer is formed. The method for removing the solvent may be a natural drying method, a ventilation drying method, a heat drying method, a reduced-pressure drying method, or the like.

The method for rubbing may be a method in which an alignable polymer film on the substrate surface, which has been formed by applying the alignable polymer composition to the substrate, followed by annealing, is brought into contact with a rotating rubbing roll having a rubbing cloth wound therearound.

A photoalignment film is usually obtained by applying a composition containing a photoreactive-group-containing polymer or monomer and a solvent (hereinafter sometimes referred to as "composition for photoalignment film formation") to the substrate, followed by exposure to polarized light (preferably polarized by). A photoalignment film is more preferable in that the direction of the alignment regulation force can be arbitrarily controlled by selecting the polarization direction of the applied polarized light.

A photoreactive group is a group that produces liquid crystal alignability in response to exposure to light. Specifically, in response to exposure to light, a photoreactive group causes a photoreaction that gives origin to liquid crystal alignability, such as a molecule alignment induction or isomerization reaction, a dimerization reaction, a photocrosslinking reaction, or a photodegradation reaction. Among such photoreactive groups, those that cause a dimerization reaction or a photocrosslinking reaction have excellent alignment properties and thus are preferable. As photoreactive groups that can cause the above reactions, those having an unsaturated bond, particularly a double bond, are preferable, and groups having at least one member selected from the group consisting of a carbon-carbon double bond (C=C bond), a carbon-nitrogen double bond (C=N bond), a nitrogen-nitrogen double bond (N=N bond), and a carbon-oxygen double bond (C=O bond) are particularly preferable.

Examples of photoreactive groups having a C=C bond include a vinyl group, a polyene group, a stilbene group, a stilbazole group, a stilbazolium group, a chalcone group, and a cinnamoyl group. Examples of photoreactive groups having a C=N bond include groups having the structure of aromatic Schiff base, aromatic hydrazone, etc. Examples of photoreactive groups having an N=N bond include an azobenzene group, an azonaphthalene group, an aromatic heterocyclic azo group, a bisazo group, a formazan group, and those having azoxybenzene as the basic structure. Examples of photoreactive groups having a C=O bond include a benzophenone group, a coumarin group, an anthraquinone group, and a maleimide group. These groups may have substituents such as an alkyl group, an alkoxy group, an aryl group, an allyloxy group, a cyano group, an alkoxycarbonyl group, a hydroxyl group, a sulfonic acid group, and an alkyl halide group.

Among them, photoreactive groups that are involved in a photoclimerization reaction are preferable. A cinnamoyl group and a chalcone group are preferable because the polarized light exposure dose required for photoalignment is relatively small, and also a photoalignment layer having excellent thermal stability and long-term stability is likely to be obtained. As photoreactive-group-containing polymers, those having a cinnamoyl group, which have a cinnamic acid structure at a terminal of the polymer side chain, are particularly preferable.

As solvents for the composition for photoalignment film formation, those that dissolve the photoreactive-group-containing polymer and monomer are preferable, and examples of such solvents include those mentioned above as solvents for the alignable polymer composition.

The content of the photoreactive-group-containing polymer or monomer in the composition for photoalignment film formation can be suitably adjusted according to the kind of photoreactive-group-containing polymer or monomer and the thickness of aphotoalignment film to be produced. The content is preferably at least 0.2 mass % or more, and particularly preferably within a range of 0.3 to 10 mass %. In addition, as long as the characteristics of the photoalignment film are not significantly damaged, the composition may also contain polymer materials, such as polyvinyl alcohol and polyimide, and photosensitizers.

The method for applying the composition for photoalignment film formation to the substrate may be the same as those mentioned as methods for applying the alignable polymer composition to the substrate. The method for removing the solvent from the applied composition for photoalignment film formation may be the same as those mentioned as methods for removing the solvent from the alignable polymer composition, for example.

Exposure to polarized light may be a style in which a film resulting from the removal of the solvent from the composition for photoalignment film formation applied onto the substrate is directly exposed to polarized light, or may also be a style in which the substrate side is exposed to polarized light so that the film is exposed to the polarized light therethrough. In addition, it is particularly preferable that the polarized light is substantially parallel light. The wavelength of the polarized light should be within a wavelength region where the photoreactive group of the photoreactive-group-containing polymer or monomer can absorb the light energy. Specifically, UV (ultraviolet radiation) in a wavelength range of 250 to 400 nm is particularly preferable. The light source used for the exposure to polarized light may be a xenon lamp, a high-pressure mercury lamp, an extra-high pressure mercury lamp, a metal halide lamp, an ultraviolet light (such as KrF or ArF) laser, or the like. A high-pressure mercury lamp, an extra-high pressure mercury lamp, and a metal halide lamp are more preferable. These lamps are preferable because the emission intensity of ultraviolet radiation at a wavelength of 313 nm is high. Light from such a light source is applied through an appropriate polarizer, whereby exposure to polarized light can be performed. As the polarizer, a polarizing filter, a polarizing prism such as Glan-Thompson or Glan-Taylor, or a wire-grid-type polarizer can be used.

Incidentally, when masking is performed at the time of rubbing or exposure to polarized light, it is also possible to form several regions having different liquid crystal alignment directions (pattern).

A groove-alignment film is a film having a projection-depression pattern or a plurality of grooves (slots: in the film surface. In the case where liquid crystal molecules are placed on a film having a plurality of linear grooves arranged at regular intervals, the liquid crystal molecules are aligned in the direction along the slots.

The method for obtaining a groove-alignment film may be a method in which the surface of a photosensitive polyimide film is exposed to light via an exposure mask having slits of the pattern shape, followed by development and rinsing to form a projection-depression pattern; a method in which an uncured UV-curable resin layer is formed on a plate-shaped matrix having slots in the surface thereof, and the resin layer is transferred to the substrate and then cured; a method in which a rolled matrix having a plurality of slots is pressed against an uncured UV-curable resin layer formed on the substrate to form projections and depressions, followed by curing; or the like. Specifically, the methods described in JP-A-6-34976 and JP-A-2011-242743, etc., can be mentioned.

Among the above methods, the method in which a rolled matrix having a plurality of slots is pressed against the surface of an uncured UV-curable resin layer to form projections and depressions, followed by curing, is preferable. As the rolled matrix, stainless steel (SUS) is preferable in terms of durability.

Examples of UV-curable resins include a polymer of a monofunctional acrylate, a polymer of a polyfunctional acrylate, or a polymer of a mixture thereof.

Monofunctional acrylates are compounds having one group selected from the group consisting of an acryloyloxy group ($CH_2$—CH—COO—) and a methacryloyloxy group ($CH_2$—C($CH_3$)—COO—) (hereinafter sometimes referred to as (meth)acryloyloxy group) In addition, (meth)acrylate means acrylate or methacrylate.

Examples of monofunctional acrylates having one (meth)acryloyloxy group include $C_{4-16}$ alkyl(meth)acrylates, $C_{2-14}$ β-carboxyalkyl(meth)acrylates, $C_{2-14}$ alkylated phenyl (meth)acrylates, methoxypolyethylene glycol(meth)acrylate, phenoxypolyethylene glycol(meth)acrylate, and isobornyl(meth)acrylate.

A polyfunctional acrylate is a compound having two or more (meth)acryloyloxy groups, and compounds having two to six (meth)acryloyloxy groups are preferable.

Examples of polyfunctional acrylates having two (meth)acryloyloxy groups include 1,3-butanediol di(meth)acrylate; 1,3-butanediol(meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bis(acryloyloxyethyl) ether of bisphenol A; ethoxylated bisphenol A di(meth)acrylate; propoxylated neopentyl glycol di(meth)acrylate; ethoxylated neopentyl glycol di(meth)acrylate, and 3-methylpentanediol di(meth)acrylate.

Examples of polyfunctional acrylates having three to six (meth)acryloyloxy groups include:

trimethylolpropane tri(meth)acrylate; pentaerythritol tri(meth)acrylate; tris(2-hydroxyethyl)isocyanurate tri(meth)acrylate; ethoxylated trimethylolpropane ti(meth)acrylate; propoxylated trimethylolpropane tri(meth)acrylate; pentaerythritol tetra(meth)acrylate; dipentaerythritol penta(meth)acrylate; dipentaerythritol hexa(meth)acrylate; tripentaerythritol tetra(meth)acrylate; tripentaerythritol pentameth)acrylate; tripentaerythritol hexa(meth)crylate; tripentaerythritol hepta(meth)acrylate; tripentaerythritol octa(meth)acrylate;

a reaction product of pentaerythritol tri(meth)acrylate and an acid anhydride; a reaction product of dipentaerythritol penta(meth)acrylate and an acid anhydride;

a reaction product of tripentaerythritol hepta(meth)acrylate and an acid anhydride;

caprolactone-modified trimethylol propane tri(meth)acrylate; caprolactone-modified pentaerythritol tri(meth)acrylate; caprolactone-modified tris(2-hydroxyethyl)isocyanurate tri(meth)acrylate; caprolactone-modified pentaerythritol tetra(meth)acrylate; caprolactone-modified dipentaerythritol penta(meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth)acrylate; caprolactone-modified tripentaerythritol octa(meth)acrylate; a reaction product of caprolactone-modified pentaerythritoltri(meth)ylateandan acid anhydride; a reaction product of caprolactone-modified dipentaerythritol Penta(meth)acrylate and an acid anhydride; and a reaction product of caprolactone-modified tripentaerythritol hepta(meth)acrylate and an acid anhydride.

"Caprolactone-modified" means that the (meth)acrylate compound has ring-opened caprolactone or a ring-opening polymer introduced between the alcohol-derived moiety and the (meth)acryloyloxy group.

Polyfunctional acrylates are available in the market. Examples of commercially available products include A-DOD-N, A-HD-N, A-NOD-N, APG-100, APG-200, APG-400, A-GLY-9E, A-GLY-20E, A-TMM-3, A-TMPT, AD-TMP, ATM-35E, A-TMMT, A-9550, A-DPH, HD-N, NOD-N, NPG, and TMPT [Shin-Nakamura Chemical Co., Ltd.], "ARONIX M-220" as well as "M-325", "M-240", "M-270", "M-309", "M-310", "M-321", "M-350", "M-360", "M-305", "M-306", "M-450", "M-451", "M-408", "M-400", "M-402", "M-403", "M-404", "M-405", and "M-406" [Toagosei, Co., Ltd.]", and "EBECRYL11" as well as "145", "150", "40", "140", and "180", and the DPGDA, HDDA, TPGDA, HPNDA, PETIA, PETRA, TMPTA, TMPEOTA, DPHA, and EBECRYL series [DAICEL-CYTEC Co., Ltd.].

In order to obtain alignment with less alignment disorder, the width of the projecting portion of the groove-alignment film is preferably 0.05 µm to 5 µm, the width of the depressed portion is preferably 0.1 µm to 5 µm, and the depth of the difference between the protecting portion and the depressed portion is preferably 2 µm or less, and preferably 0.01 µm to 1 µm or less.

When the alignment film has a functional group that forms a chemical bond with the substrate, the sticking force (F2) between the substrate and the alignment film tends to increase. In addition, when the alignable polymer composition or the composition for photoalignment film formation contains a reagent that crosslinks the substrate and the alignment film, F2 tends to increase. In addition, when the alignable polymer composition or the composition for photoalignment film formation contains a solvent that dissolves the substrate or a like component, F2 tends to increase. Therefore, in order for F2 to be less than 1 N/25 mm, it is preferable that the alignment film has fewer functional groups that form a chemical bond with the substrate, and it is also preferable that the alignable polymer composition and the composition for photoalignment film formation does not contain a reagent that crosslinks the substrate and the alignment film and a solvent that dissolves the substrate or a like component. When the substrate surface is dissolved by the solvent or a like component contained in the alignable polymer composition or the composition for photoalignment film formation, F2 tends to increase. In addition, in order for F2 to be 0.02 N/25 mm or more, these factors should be suitably adjusted.

In addition, when the alignment film has a functional group that forms a chemical bond with the liquid crystal cured film, the sticking force (F3) between the liquid crystal cured film and the alignment film tends to increase. In addition, when the alignable polymer composition or the composition for photoalignment film formation contains are agent that crosslinks the liquid crystal cured film and the alignment film, F3 tends to increase. Therefore, in order for F3 to be less than 1 N/25 mm, it is preferable that the alignment film has fewer functional groups that form a chemical bond with the liquid crystal cured film, and it is also preferable that the alignable polymer composition and the composition for photoalignment film formation does not contain a reagent that crosslinks the liquid crystal cured film and the alignment film. In addition, in order for F3 to be 0.02 N/25 mm or more, these factors should be suitably adjusted.

<Liquid Crystal Cured Film>

The liquid crystal cured film in the invention is a film that has a thickness of 5 µm or less and is cured with a polymerizable liquid crystal compound aligned, and is preferably a film cured with a polymerizable liquid crystal compound aligned in the direction horizontal to the substrate plane.

The thickness of the liquid crystal cured film is preferably within a range of 0.5 µm or more and 3 µm or less, and still more preferably 1 µm or more and 3 µm or less. The thickness of the liquid crystal cured film can be measured by an interference thickness meter, a laser microscope, or a contact-type thickness meter.

It is preferable that the liquid crystal cured film is a retardation film whose birefringence $\Delta n$ ($\lambda$) for light having a wavelength of $\lambda$ nm shows retardation characteristics expressed by the following equations (1), (2), and (3), a retardation film having a refractive index relation expressed by the following equation (4), or a polarizing film containing a dichroic pigment.

$$\Delta n(450)/\Delta n(550) \leq 1.00 \tag{1}$$

$$1.00 \leq \Delta n(650)/\Delta n(550) \tag{2}$$

$$100 < Re(550) < 150 \tag{3}$$

$\Delta n(450)$, $\Delta n(550)$, and $\Delta n(650)$ represent the birefringence at wavelengths of 450 nm, 550 nm, and 650 nm, respectively.

$$nz > nx \approx ny \tag{4}$$

nz represents are fractive index in the thickness direction, nx represents a refractive index in the direction that gives the maximum refractive index in the plane, and nor represents a refractive index in the direction that is perpendicular to the direction of nx in the plane.

Birefringence Δn (λ) is determined by measuring the retardation and dividing it by the thickness of the liquid crystal cured film. Although specific measurement methods are shown in the Examples, at this time, when a film formed on a substrate having no retardation in itself, such as a glass substrate, is subjected to the measurement, the substantial characteristics of the liquid crystal cured film can be measured.

In the retardation film having a refractive index relation expressed by equation (4), the front retardation value Re(550) for 550-nm light is preferably 0 to 10 nm, and more preferably 0 to 5 nm. The thickness-direction retardation value Rth is preferably −10 nm to −300 nm, and more preferably −20 nm to −200 nm. Among retardation films having a refractive index relation expressed by equation (4), those having such optical characteristics are particularly suitable for the compensation of an IPS (in-plane switching)-mode liquid crystal display device.

Rth can be calculated from the retardation value $R_{40}$, which is measured with the in-plane phase-leading axis inclined at 40° as the inclined axis, and the in-plane retardation value $R_0$. That is, using the following equations (9) to (11), nx, ny, and nz are calculated from the in-plane retardation value $R_0$, the retardation value $R_{40}$ measured with the phase-leading axis inclined at 40° as the inclined axis, the liquid crystal cured film thickness d, and the average refractive index no of the liquid crystal cured film, and then the obtained nx, ny, and nz are substituted into equation (8), whereby Rth can be calculated.

$$Rth=[(nx-ny)/2-nz] \times d \qquad (8)$$

$$R0=(nx-ny) \times d \qquad (9)$$

$$R40=(nx-ny') \times d/\cos(\phi) \qquad (10)$$

$$(nx+ny+nz)/3-n_0 \qquad (11)$$

Here, $$\phi=\sin^{-1}[\sin(40°)/n_0]$$

$$ny'=ny \times nz/[ny^2 \times \sin^2(\phi)+nz^2 \times \cos^2(\phi)]^{1/2}$$

The liquid crystal cured film is usually obtained by applying a composition containing a polymerizable liquid crystal compound (hereinafter sometimes referred to as composition for liquid crystal cured film formation) to the alignment film surface, and polymerizing the polymerizable liquid crystal compound. In addition, it can also be obtained by applying a composition for liquid crystal cured film formation to the substrate surface, and polymerizing the polymerizable liquid crystal compound.

A polymerizable liquid crystal compound is a compound having a polymerizable group and also having liquid crystallinity. A polymerizable group means a group that is involved in a polymerization reaction and is preferably a photopolymerizable group. A photopolymerizable group herein is a group that can be involved in a polymerization reaction through an active radical, an acid, or the like resulting from the below-mentioned photopolymerization initiator. Examples of polymerizable groups include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Among them, an acryloyloxy group, a methacryloyloxy group, a vinyloxy group, an oxiranyl group, and an oxetanyl group are preferable, and an acryloyloxy group is more preferable. Liquid crystallinity may be thermotropic liquid crystals or lyotropic liquid crystals, and such thermotropic liquid crystals may be nematic liquid crystals or smectic liquid crystals.

Among them, as a polymerizable liquid crystal compound in the case where the liquid crystal cured film is a retardation film, thermotropic nematic liquid crystals are preferable in terms of the ease of production. In addition, in terms of imparting retardation characteristics expressed by the above equation (1) and equation (2), a compound represented by the following formula (A) (hereinafter sometimes referred to as compound (A)) is preferable. Such polymerizable liquid crystal compounds may be used alone or in combination.

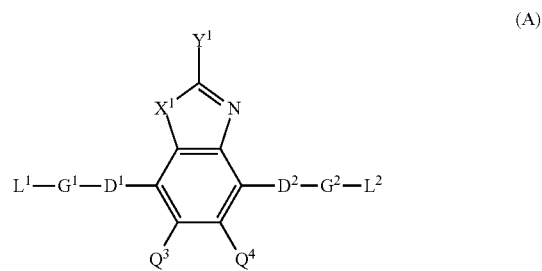

(A)

[In the formula (A), $X^1$ represents an oxygen atom, a sulfur atom, or $NR^1$—. $R^1$ represents a hydrogen atom or a $C_{1-4}$ alkyl group.

$Y^1$ represents an optionally substituted $C_{4-12}$ monovalent aromatic hydrocarbon group or an optionally substituted $C_{3-12}$ monovalent aromatic heterocyclic group.

$Q^3$ and $Q^4$ each independently represent a hydrogen atom, an optionally substituted $C_{1-20}$ monovalent aliphatic hydrocarbon group, a $C_{3-20}$ monovalent alicyclic hydrocarbon group, an optionally substituted $C_{6-20}$ monovalent aromatic hydrocarbon group, a halogen atom, a cyano group, a nitro group, —$NR^2R^3$, or —$SR^2$, or $Q^3$ and $Q^4$ are bonded to each other to form an aromatic ring or a heteroaromatic ring together with the carbon atom to which they are bonded. $R^2$ and $R^3$ each independently represent a hydrogen atom or a $C_{1-6}$ alkyl group.

$D^1$ and $C^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —XO—O—$CR^4R^5$—, —O—CO—$CR^4R^5$—, —$CR^4R^5$—O—CO—$CR^6R^7$—, —$CR^4R^5$—CO—O—$CR^6R^7$—, $NR^4$—$CR^5R^6$—, or CO—$NR^4$—.

$R^4$, $R^5$, $R^6$, and $R^7$ each independently represent a hydrogen atom, a fluorine atom, or a $C_{1-4}$ alkyl group.

$G^1$ and $G^2$ each independently represent a $C_{5-8}$ divalent alicyclic hydrocarbon group. The methylene group forming the alicyclic hydrocarbon group is optionally substituted with an oxygen atom, a sulfur atom, or NH—, and the methine group forming the alicyclic hydrocarbon group is optionally substituted with a tertiary nitrogen atom.

$L^1$ and $L^2$ each independently represent a monovalent organic group, and at least one of $L^1$ and $L^2$ has a polymerizable group.

In the compound (A), $L^1$ is preferably a group represented by formula (A1), and $L^2$ is preferably a group represented by formula (A2).

$$P^1-F^1-(B^1-A^1)_k-E^1- \qquad (A1)$$

$$P^2-F^2-(B^2-A^2)_l-F^2- \qquad (A2)$$

[In the formula (A1) and formula (A2), $B^1$, $B^2$, $E^1$, and $E^2$ each independently represent —$CR^4R^5$—, —$CH_2$—$CH_2$—, —O—, —S—, —CO—O—, —O—CO—O—, —CS—O—, —O—CS—O—, —CO—$NR^1$—, —O—$CH_2$—, —S—$CH_2$—, or a single bond.

$A^1$ and $A^2$ each independently represent a $C_{5-8}$ divalent alicyclic hydrocarbon group or a $C_{6-18}$ divalent aromatic hydrocarbon group. The methylene group forming the alicyclic hydrocarbon group is optionally substituted with an oxygen atom, a sulfur atom, or NH—, and the methine group forming the alicyclic hydrocarbon group is optionally substituted with a tertiary nitrogen atom.

k and l each independently represent an integer of 0 to 3, $F^1$ and $F^2$ represent a $C_{1-12}$ divalent aliphatic hydrocarbon group.

P represents a polymerizable group.

$P^2$ represents a hydrogen atom or a polymerizable group.

$R^4$ and $R^5$ each independently represent a hydrogen atom, a fluorine atom, or a $C_{1-4}$ alkyl group.]

A preferred example of the compound (A) is the polymerizable liquid crystal compound described in JP-W-2011-207765.

As a polymerizable liquid crystal compound other than the compound (A), a compound having a group represented by formula (X) can be mentioned (hereinafter sometimes referred to as "compound (X)"), for example.

$$P^{11}\text{—}B^{11}\text{-}E^{11}\text{-}B^{12}\text{-}A^{11}\text{-}B^{13}\text{—} \quad (X)$$

In the formula (X), $P^{11}$ represents a polymerizable group.

$A^{11}$ represents a divalent alicyclic hydrocarbon group or a divalent aromatic hydrocarbon group. The hydrogen atom contained in the divalent alicyclic hydrocarbon group and the divalent aromatic hydrocarbon group is optionally substituted with a halogen atom, a $C_{1-6}$ alkyl group, a $C_{1-6}$ alkoxy group, a cyano group, or a nitro group, and the hydrogen atom contained in the $C_{1-6}$ alkyl group and the $C_{1-6}$ alkoxy group is optionally substituted with a fluorine atom.

$B^{11}$ represents —O—, —S—, —Co—C—, —O—CO—, —O—CO—O—, —CO—$NR^{16}$—, —$NR^{16}$—CO—, —CO—, —CS—, or a single bond. $R^{16}$ represents a hydrogen atom or a $C_{1-6}$ alkyl group.

$B^{12}$ and $B^{13}$ each independently represent —C≡C—, —CH=CH—, —$CH_2$—$CH_2$—, —O—, —S—, —C(=O)—, —C(=O)—O—, —O—C(=O)—, —O—C(=O)—O—, —CH=N—, —N=CH—, —N=N—, —C(=O)—$NR^{16}$—, —$NR^{16}$—C(=O)—, —$OCH_2$—, —$OCF_2$—, —$CH_2O$—, —$CF_2O$—, —CH=CH—C(=O)—O—, —O—C(=O)—CH=CH—, or a single bond.

$E^{11}$ represents a $C_{1-12}$ alkanediyl group. The hydrogen atom contained in the alkanediyl group is optionally substituted with a $C_{1-5}$ alkoxy group, and the hydrogen atom contained in the alkoxy group is optionally substituted with a halogen atom. In addition, the —$CH_2$— forming the alkanediyl group may be substituted by —O— or —CO—.]

Specific examples of polymerizable liquid crystal compounds include compounds having a polymerizable group out of the compounds described in "Ekisho Binran" (Handbook of Liquid Crystals) (edited by Ekisho Binran Henshu Iinkai, Maruzen, Oct. 30, 2000), "3.8.6. Network (Fully Cross-Linked)", "6.5.1. Liquid Crystal Material, b. Polymerizable Nematic Liquid Crystal Material", as well as the polymerizable liquid crystal compounds described in JP-A-2010-31223, JP-A-2010-200108, JP-A-2011-6360, and JP-A-2011-207765.

In the case where the liquid crystal cured film is a retardation film having a refractive index relation expressed by the equation (4), liquid crystal alignment in the polymerizable liquid crystal compound forming the liquid crystal cured film is preferably perpendicular alignment. In order to perpendicularly align the polymerizable liquid crystal compound, it is preferable to use an alignment film having a nonpolar substituent selected from a silicon atom, a fluorine atom, and the like. As the alignment film, a material generally used as a liquid crystal alignment film for perpendicularly aligned liquid crystal display elements can be used, such as those described in U.S. Pat. No. 4,605,016, U.S. Pat. No. 4,985,906, U.S. Pat. No. 4,502,119, and WO 2008/117760.

In the case where the liquid crystal cured film is a polarizing film, the polymerizable liquid crystal compound may be a nematic liquid crystal compound or a smectic liquid crystal compound. However, in terms of obtaining higher polarization characteristics, a smectic liquid crystal compound is preferable, and a higher-order smectic liquid crystal compound is more preferable. In particular, higher-order smectic liquid crystal compounds forming smectic-B phase, smectic-D phase, smectic-E phase, smectic-F phase, smectic-G phase, smectic-H phase, smectic-I phase, smectic-J phase, smectic-K phase, or smectic-L phase are more preferable, and higher-order smectic liquid crystal compounds forming smectic-B phase, smectic-F phase, or smectic-I phase are more preferable. When the liquid crystal phase formed by the polymerizable liquid crystal compound is such a higher-order smectic phase, a polarizing film with a higher order of alignment can be produced. In addition, in X-ray diffraction measurement, a polarizing film with such a higher order of alignment produces a Bragg peak resulting from a higher-order structure, such as a hexatic phase or a crystal phase. The Bragg peak is a peak resulting from the periodic structure of molecular alignment, and a film having a periodic interval of 3.0 to 6.0 Å can be obtained. A specific example of such a compound is a compound represented by the following formula (B) (hereinafter sometimes referred to as compound (B)). Such polymerizable liquid crystal compounds may be used alone or in combination.

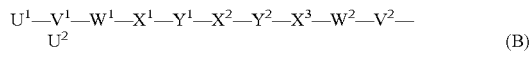

$$U^1\text{—}V^1\text{—}W^1\text{—}X^1\text{—}Y^1\text{—}X^2\text{—}Y^2\text{—}X^3\text{—}W^2\text{—}V^2\text{—}U^2 \quad (B)$$

[In the formula (B), $X^1$, $X^2$, and $X^3$ each independently represent an optionally substituted 1,4-phenylene group or an optionally substituted cyclohexane-1,4-diyl group. However, at least one of $X^1$, $X^2$, and $X^3$ is an optionally substituted 1,4-phenylene group. The forming the cyclohexane-1,4-diyl group may be substituted by —O—, —S—, or —NR—. R represents a $C_{1-6}$ alkyl group or a phenyl group.

$Y^1$ and $Y^2$ each independently represent —$CH_2CH_2$—, —$CH_2O$—, —COO—, —OCOO—, a single bond, —N=N—, —$CR^a$=$CR^b$—, —C≡C—, or —$CR^a$=N—. $R^a$ and $R^b$ each independently represent a hydrogen atom or a $C_{1-4}$ alkyl group.

$U^1$ represents a hydrogen atom or a polymerizable group.

$U^2$ represents a polymerizable group.

$W^1$ and $W^2$ each independently represent a single bond, —O—, —S—, —COO—, or —OCOO—.

$V^1$ and $V^2$ each independently represent an optionally substituted $C_{1-20}$ alkanediyl group, and the —$OH_2$— forming the alkanediyl group may be substituted by —O—, —S—, or —NH—.]

In the compound (B), it is preferable that at least one of $X^1$, $X^2$, and $X^3$ is an optionally substituted 1,4-phenylene group.

It is preferable that the optionally substituted 1,4-phenylene group has no substituent. It is preferable that the optionally substituted cyclohexane-1,4-diyl group is an optionally substituted trans-cyclohexane-1,4-diyl group, and it is preferable that the optionally substituted trans-cyclohexane-1,4-diyl group has no substituent.

Examples of substituents that are optionally present on the optionally substituted 1,4-phenylene group or the optionally substituted cyclohexane-1,4-diyl include $C_{1-4}$ alkyl groups such as a methyl group, an ethyl group, and a butyl group, a cyano group, and a halogen atom.

$Y^1$ is preferably —$CH_2CH_2$—, —COO—, or a single bond, and $Y^2$ is preferably —$CH_2CH_2$— or —$CH_2O$—.

$U^2$ is a polymerizable group. $U^1$ is a hydrogen atom or a polymerizable group, and is preferably a polymerizable group. It is preferable that $U^1$ and $U^2$ are both polymerizable groups, and that they are both photopolymerizable groups. A polymerizable liquid crystal compound having a photopolymerizable group is advantageous in that polymerization can be carried out under low-temperature conditions.

The polymerizable groups represented by $U^1$ and $U^2$ may be different from each other, but are preferably the same. Examples of polymerizable groups include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Among them, an acryloyloxy group, a methacryloyloxy group, a vinyloxy group, an oxiranyl group, and an oxetanyl group are preferable, and an acryloyloxy group is more preferable.

Examples of alkanediyl groups represented by $V^1$ and $V^2$ include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, a decane-1,10-diyl group, a tetradecane-1,14-diyl group, and an icosane-1,20-diyl group. $V^1$ and $V^2$ are preferably $C_{2-12}$ alkanediyl groups, and more preferably $C_{6-12}$ alkanediyl groups.

Examples of substituents optionally preset on the optionally substituted $C_{1-20}$ alkanediyl group include a cyano group and a halogen atom. However, the alkanediyl group preferably has no substituent, and is more preferably an unsubstituted, linear alkanediyl group.

It is preferable that $W^1$ and $W^2$ are each independently a single bond or —O—.

Specific examples of the compound (B) include compounds represented by formula (1-1) to formula (1-23). In the case where the compound (B) has a cyclohexane-1,4-diyl group, it is preferable that the cyclohexane-1,4-diyl group is in trans.

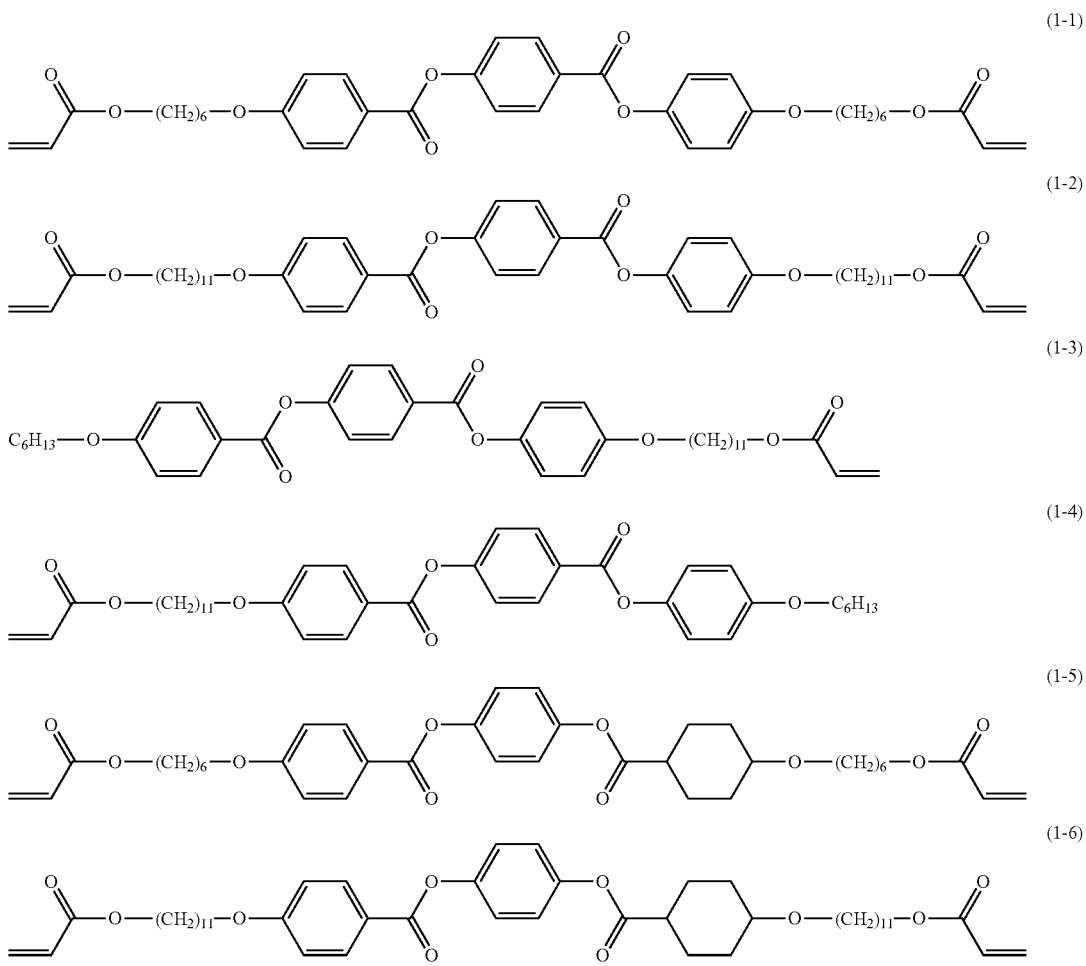

(1-7)
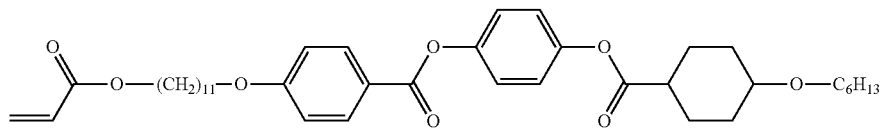
(1-8)
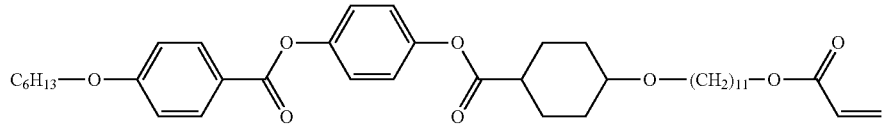
(1-9)
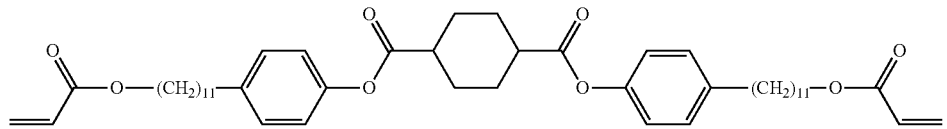
(1-10)
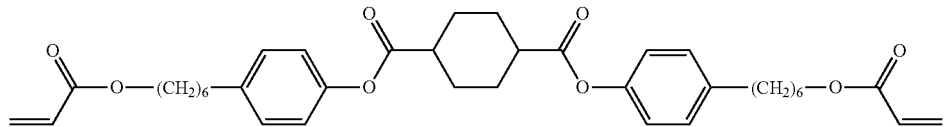
(1-11)
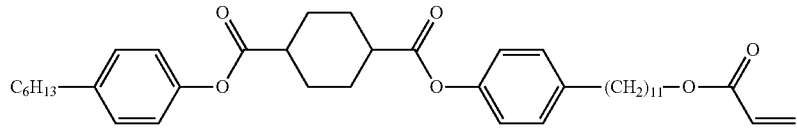
(1-12)
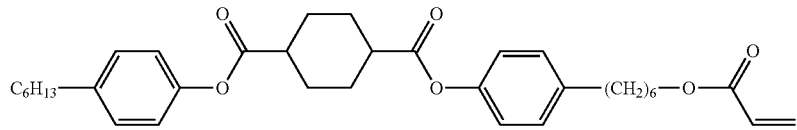
(1-13)
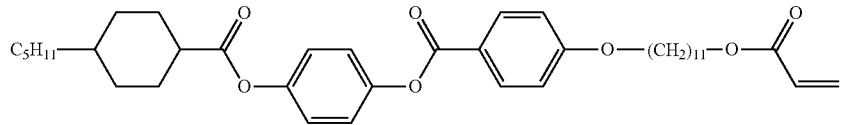
(1-14)
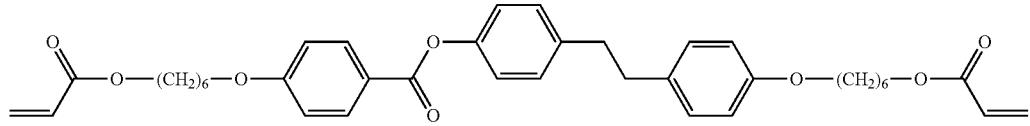
(1-15)
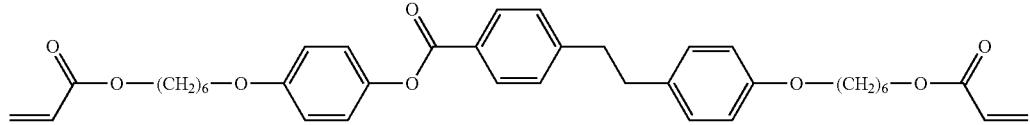
(1-16)
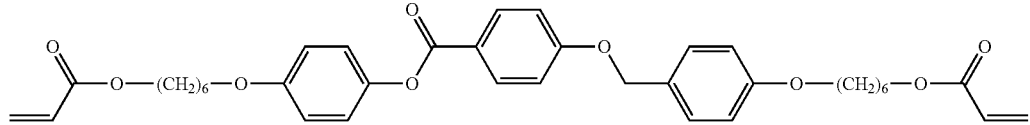
(1-17)
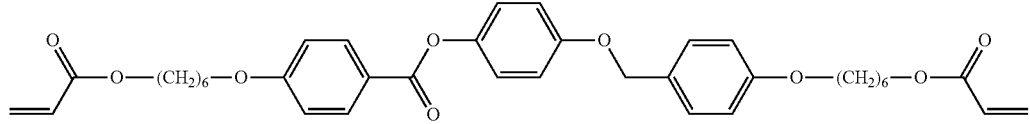

-continued

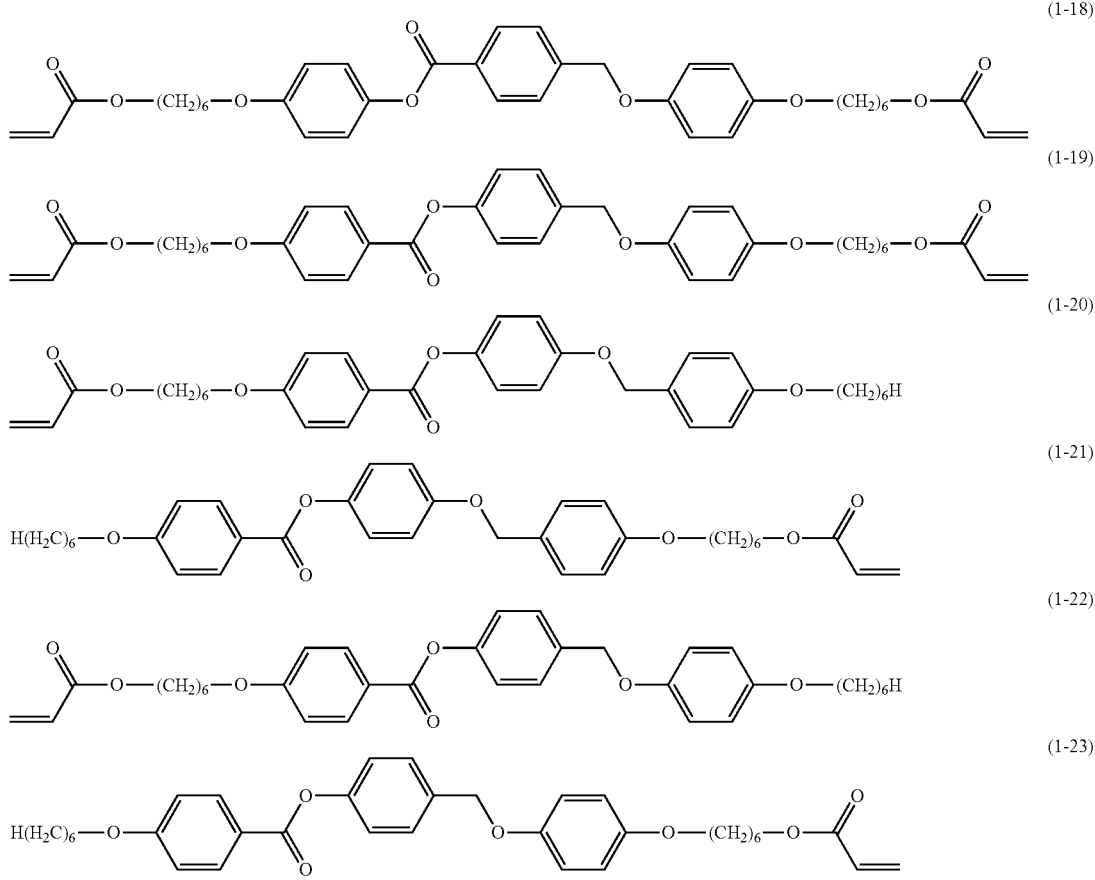

Among the examples of the compound (B), it is preferable that the compound (B) is at least one member selected from the group consisting of compounds represented by formula (1-2), formula (1-3), formula (1-4), formula (1-6), formula (1-7), formula (1-8), formula (1-13), formula (1-14), and formula (1-15).

The examples of the compound (B) may be used alone or in combination for the liquid crystal cured film. In addition, in the case where two or more kinds of polymerizable liquid crystal compounds are used in combination, it is preferable that at least one kind is the compound (B), and it is more preferable that two or more kinds are the compounds (B). The combined use may allow liquid crystallinity to be temporarily maintained even at a temperature equal to or lower than the liquid crystal-crystal phase transition temperature. In the case where two kinds of polymerizable liquid crystal compounds are used in combination, the mixing ratio is usually 1:99 to 50:50, preferably 5:95 to 50:50, and more preferably 10:90 to 50:50.

The compound (B) is produced by the known method described, for example, in Lub et al., Recl. Trav. Chim. Pays-Bas, 115, 321-328 (1996) or U.S. Pat. No. 4,719,156.

The proportion of the polymerizable liquid crystal compound in the composition for liquid crystal cured film formation is usually 70 to 99.5 parts by mass relative to 100 parts by mass of the solids content of the composition for liquid crystal cured film formation, preferably 80 to 99 parts by mass, more preferably 80 to 94 parts by mass, and still more preferably 80 to 90 parts by mass. When the proportion of the polymerizable liquid crystal compound is within the above range, the alignment properties tend to increase. The solids content herein means the total amount of the components of the composition for liquid crystal cured film formation excluding the solvent.

As components other than the polymerizable liquid crystal compound, the composition for liquid crystal cured film formation may also contain a dichroic pigment, a solvent, a polymerization initiator, a polymerization reaction aid, and a leveling agent.

<Dichroic Pigment>

In the case where the liquid crystal cured film is a polarizing film, it is preferable that the composition for liquid crystal cured film formation contains a dichroic pigment. A dichroic pigment refers to a pigment having the property that the absorbance in the long-axis direction of the molecule is different from the absorbance in the short-axis direction.

As the dichroic pigment, those having the maximum absorption wavelength (λMAX) at 300 to 700 nm are preferable. Examples of such dichroic pigments include acridine pigments, oxazine pigments, cyanine pigments, naphthalene pigments, azo pigments, and anthraquinone pigments. Among them, azo pigments are preferable. Examples of azo pigments include monoazo pigments, bisazo pigments, trisazo pigments, tetrakisazo pigments, and stilbeneazo pigments. Bisazo pigments and trisazo pigments are preferable. Dichroic pigments may be used alone or in combination, and it is preferable to use three or more kinds in combination. In particular, it is preferable to use three or more kinds of azo compounds in combination.

Examples of azo pigments include compounds represented by formula (2) (hereinafter sometimes referred to as "compound (2)").

[In the formula (2), $A^1$ and $A^3$ each independently represent an optionally substituted phenyl group, an optionally substituted naphthyl group, or an optionally substituted monovalent heterocyclic group. $A^3$ represents an optionally substituted 1,4-phenylene group, an optionally substituted naphthalene-1,4-diyl group, or an optionally substituted divalent heterocyclic group. p represents an integer of 1 to 4. In the case where p is an integer of 2 or more, the plurality of $A^2$s may be the same or different from each other]

cyano group; a nitro group; a halogen atom; and substituted or unsubstituted amino groups such as an amino group, a diethylamino group, and a pyrrolidino group (a substituted amino group means an amino group having one or two $C_{4-6}$ alkyl groups or an amino group in which two substituted alkyl groups are bonded to each other to form a $C_{2-8}$ alkanediyl group) and an unsubstituted amino group is $—NH_2$). Incidentally, specific examples of $C_{1-6}$ alkyl groups are the same as those mentioned as examples of substituents optionally present on the phenylene group of the compound (1), etc.

Among compounds (2), compounds respectively represented by the following formula (2-1) to formula (2-6) are preferable.

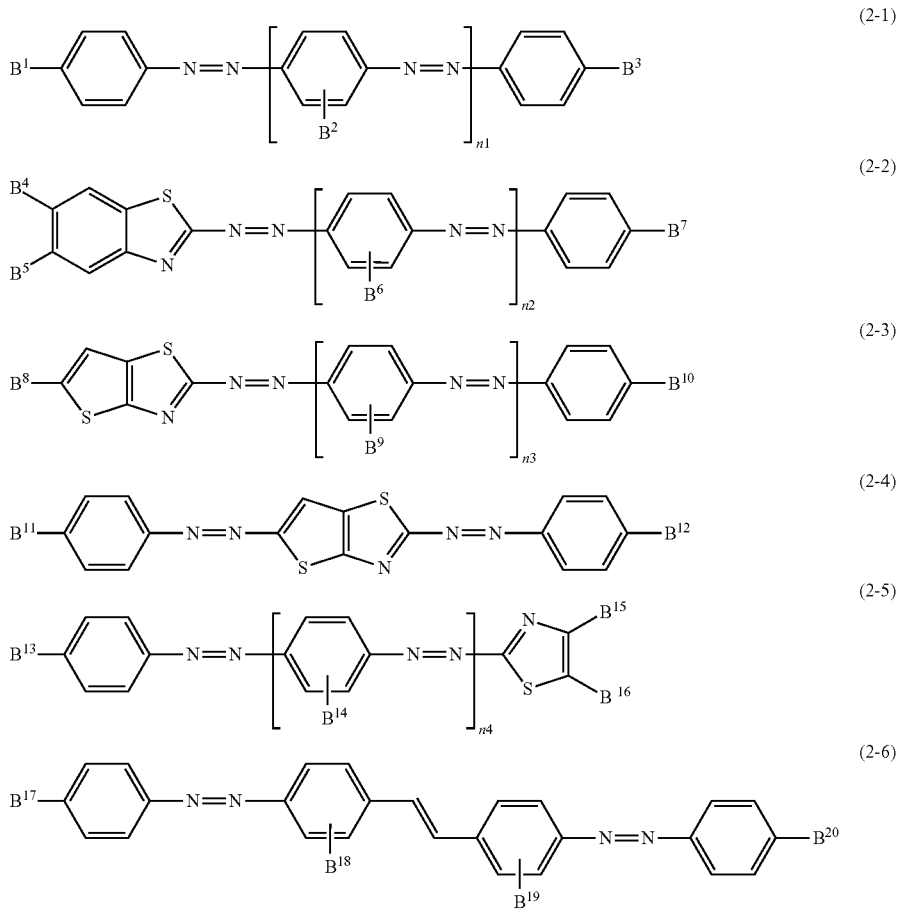

Examples of monovalent heterocyclic groups include groups obtained by removing one hydrogen atom from a heterocyclic compound such as quinoline, thiazole, benzothiazole, thienothiazole, imidazole, benzimidazole, oxazole, and benzoxazole. Examples of divalent heterocyclic groups include groups obtained by removing two hydrogen atoms from a heterocyclic compound as mentioned above.

Examples of substituents optionally present on the phenyl group, the naphthyl group, and the monovalent heterocyclic group in $A^1$ and $A^3$ and the p-phenylene group, the naphthalene-1,4-diyl group, and the divalent heterocyclic group in $A^2$ include $C_{1-4}$ alkyl groups; $C_{1-4}$ alkoxy groups such as a methoxy group, an ethoxy group, and a butoxy group; $C_{1-4}$ fluorinated alkyl groups such as a trifluoromethyl group; a

[In the formulae 2-1) to (2-6), $B^1$ to $B^{20}$ each independently represent a hydrogen atom, a $C_{1-6}$ alkyl group, a $C_{1-4}$ alkoxy group, a cyano group, a nitro group, a substituted or unsubstituted amino group (substituted and unsubstituted amino groups are as defined above), a chlorine atom, or a trifluoromethyl group.

n1 to n4 each independently represent an integer of 0 to

In the case where n1 is 2 or more, the plurality of $B^2$s may be the same or different from each other.

In the case where n2 is 2 or more, the plurality of $B^6$s may be the same or different from each other.

In the case where n3 is 2 or more, the plurality of $B^8$s may be the same or different from each other.

In the case where n4 is 2 or more, the plurality of $B^{14}$s may be the same or different from each other.]

As the anthraquinone pigment, compounds represented by formula (2-7) are preferable.

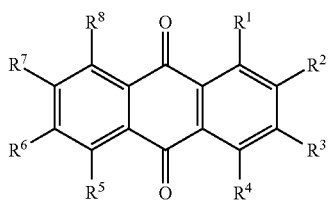
(2-7)

[In the formula (2-7), $R^1$ to R each independently represent a hydrogen atom, $-R^K$, $-NH_2$, $-NHR^x$, $-NR^x_2$, $-SR^x$, or a halogen atom.

$R^x$ represents a $C_{1-4}$ alkyl group or a $C_{6-12}$ aryl group.]

As the oxazone pigment, compounds represented by formula (2-0) are preferable.

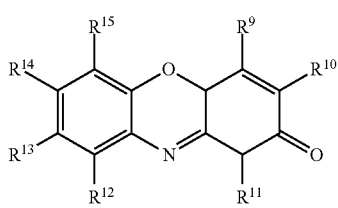
(2-8)

[In the formula (2-8), $R^9$ to $R^{15}$ each independently represent a hydrogen atom, $-R^x$, $-NH_2$, $-NHR^x_2$, $-SR^x$, or a halogen atom.

$R^E$ represents a $C_{1-4}$ alkyl group or a $C_{6-12}$ aryl group.]

As the acridine pigment, compounds represented by formula (2-9) are preferable.

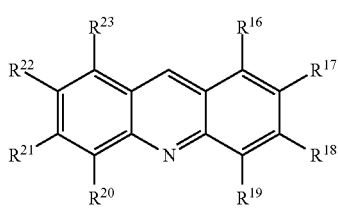
(2-9)

[In the formula (2-9), $R^{16}$ to $R^{23}$ each independently represent a hydrogen atom, $-R^x$, $-NH_2$, $-NHR^x$, $-NR^x_2$, $-SR^x$, or a halogen atom.

$R^x$ represents a $C_{1-4}$ alkyl group or a $C_{6-12}$ aryl group.]

With respect to a group represented by $R^x$ in the formula (2-7), formula (2-6), and formula (2-9), examples of $C_{1-4}$ alkyl groups include a methyl group, an ethyl group, a propyl group, a butyl group, a pentyl group, and a hexyl group, and examples of $C_{5-12}$ aryl groups include a phenyl group, a toluyl group, a xylyl group, and a naphthyl group.

As the cyanine pigment, compounds represented by formula (2-10) and compounds represented by formula (2-11) are preferable.

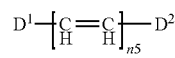
(2-10)

[In the formula (2-10, $D^1$ and $D^2$ each independently represent a group represented by any of formula (2-10a) to formula (2-10d).

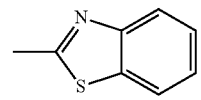
(2-10a)

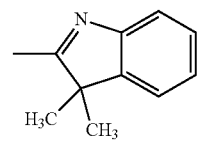
(2-10b)

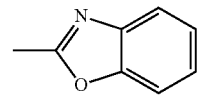
(2-10c)

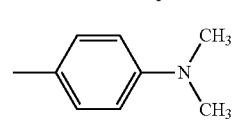
(2-10d)

n5 represents an integer of 1 to 3.]

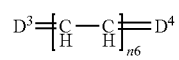
(2-11)

[In the formula (2-11), $D^3$ and $D^4$ each independently represent a group represented by any of formula 2-11a) to formula (2-11h).

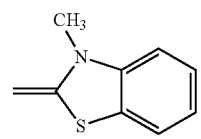
(2-11a)

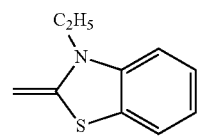
(2-11b)

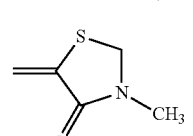
(2-11c)

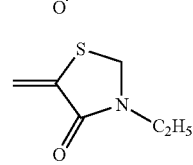
(2-11d)

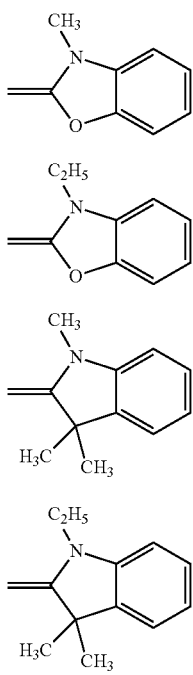

(2-11e)
(2-11f)
(2-11g)
(2-11h)

n6 represents an integer of 1 to 3.]

The content of the dichroic pigment in the composition for liquid crystal cured film formation is preferably 0.1 parts by mass or more and 30 parts by mass or less relative to 100 parts by mass of the content of the polymerizable liquid crystal compound, more preferably 0.1 parts by mass or more and 20 parts by mass or less, still more preferably 0.1 parts by mass or more and 10 parts by mass or less, and particularly preferably 0.1 parts by mass or more and 5 parts by mass or less. When the content of the dichroic pigment is within this range, polymerization can be carried out without disturbing the alignment of the polymerizable liquid crystal compound, and thus this is preferable. When the content of the dichroic pigment is too high, this may inhibit the alignment of the polymerizable liquid crystal compound. Therefore, the content of the dichroic pigment may be determined within the range where the polymerizable liquid crystal compound can maintain the liquid crystalline state.

<Solvent>

The composition for liquid crystal cured film formation usually contains a solvent. It is preferable that the solvent can completely dissolve the polymerizable liquid crystal compound, and it is also preferable that the solvent is inert to the polymerization reaction of the polymerizable liquid crystal compound.

Examples of solvents include alcoholic solvents such as methanol, ethanol, ethylene glycol, isopropyl alcohol, propylene glycol, ethylene glycol methyl ether, ethylene glycol butyl ether, and propylene glycol monomethyl ether; ester solvents such as ethyl acetate, butyl acetate, ethylene glycol methyl ether acetate, γ-butyrolactone or propylene glycol-methyl ether acetate, and ethyl lactate; ketone solvents such as acetone, methyl ethyl ketone, cyclopentanone, cyclohexanone, 2-heptanone, and methyl isobutyl ketone; aliphatic hydrocarbon solvents such as pentane, hexane, and heptane; aromatic hydrocarbon solvents such as toluene and xylene nitrile solvents such as acetonitrile; ether solvents such as tetrahydrofuran and dimethoxyethane; and chlorine-containing solvents such as chloroform and chlorobenzene. These solvents may be used alone or in combination.

The content of the solvent is preferably 50 to 98 mass % relative to the total amount of the composition for liquid crystal cured film formation. In other words, the solids content in the composition for liquid crystal cured film formation is preferably 2 to 50 mass. When the solids content is 50 mass % or less, the composition for liquid crystal cured film formation has low viscosity, providing the liquid crystal cured film with substantially uniform thickness. As a result, the liquid crystal cured film tends not to be non-uniform. In addition, the solids content can be determined in consideration of the thickness of the liquid crystal cured film to be produced.

<Polymerization Initiator>

The composition for liquid crystal cured film formation usually contains a polymerization initiator. A polymerization initiator is a compound that can start a polymerization reaction of the polymerizable liquid crystal compound, etc. As the polymerization initiator, photopolymerization initiators that generate an active radical by the action of light are preferable.

Examples of polymerization initiators include a benzoin compound, a benzophenone compound, an alkylphenone compound, an acylphosphine oxide compound, a triazine compound, an iodonium salt, and a sulfonium salt.

Examples of benzoin compounds include benzoin, benzoin methyl ether, benzoin ethyl ether, benzoin isopropyl ether, and benzoin isobutyl ether.

Examples of benzophenone compounds include benzophenone, methyl o-benzoylbenzoate, 4-phenylbenzophenone, 4-benzoyl-4'-methyldiphenyl sulfide, 3,3',4,4'-tetra (tert-butylperoxycarbonyl)benzophenone, and 2,4,6-trimethylbenzophenone.

Examples of alkylphenone compounds include di ethoxyacetophenone, 2-methyl-2-morpholino-1-(4-methylthiophenyl)propan-1-one, 2-benzyl-2-dimethylamino-1-(4-morpholinophenyl)butantan-1-one, 2-hydroxy-2-methyl-1-phenylpropan-1-one, 1,2-diphenyl-2,2-dimethoxyethan-1-one, 2-hydroxy-2-methyl-1-{4-(2-hydroxyethoxy)phenyl}propan-1-one, 1-hydroxycyclohexyl phenyl ketone, and an oligomer of 2-hydroxy-2-methyl-1-{4-(1-methylvinyl)phenyl}propan-1-one.

Examples of acyl phosphine oxide compounds include 2,4,6-trimethylbenzoyldiphenylphosphine oxide and bis(2,4,6-trimethylbenzoyl)phenylphosphine oxide.

Examples of triazine compounds include 2,4-bis(trichloromethyl)-6-(4-methoxypheny)-1,3,5-triazine, 2,4-bis(trichloromethyl)-6-(4-methoxynaphthyl)-1,3,5-triazine, 2,4-bis(trichloromethyl)-6-(4-methoystyryl)-1,3,5-triazine, 2,4-bis(trichloromethyl)-6-{2-(5-methylfuran-2-yl)ethenyl}-1,3,5-triazine, 2,4-bis(trichloromethyl)-6-{2-(furan-2-yl)ethenyl}-1,3,5-triazine, 2,4-bis(trichloromethyl)-6-{2-(4-diethylamino-2-methylphenyl)ethenyl}-1,3,5-triazine, and 2,4-bis(trichloromethyl)-6-{2-(3,4-dimethoxyphenyl)ethenyl}-1,3,5-triazine.

As the polymerization initiator, a commercially available product can be used. Examples of commercially available polymerization initiators include "Irgacure® 907", "Irgacure® 184", "Irgacure® 651", "Irgacure® 819", "Irgacure® 250", and "Irgacure® 369" (Ciba Japan); "SEIKUOL® BZ", "SEIKUOL® Z" and "SEIKUOL® BEE" (Seiko Chemical Co., Ltd.); "Kayacure® EP100" (Nippon Kayaku Co., Ltd.); "Kayacure® UVI-6992" (manufactured by Dow); "Adeka Optomer SE-152" and "Adeka Optomer SP-170" (ADEKA Corporation); "TAZ-A" and "TAZ-PP" (Siebel Hegner Japan); and "TAZ-104" (Sanwa Chemical Co., Ltd.)

The content of the polymerization initiator in the composition for liquid crystal cured film formation can be suitably adjusted according to the kind of polymerizable liquid crystal compound and its amount, and is usually 0.1 to 30 parts by mass relative to 100 parts by mass of the content of the polymerizable liquid crystal compound. The content is preferably 0.5 to 10 parts by mass, and more preferably 0.5 to 0 parts by mass. When the content of the polymerization initiator is within this range, the alignment of the polymerizable liquid crystal compound is not disturbed, and thus this is preferable.

<Sensitizer>

The composition for liquid crystal cured film formation may further contain a sensitizer. As the sensitizer, photosensitizers are preferable. Examples of such sensitizers include xanthone compounds such as xanthone and thioxanthone (e.g., 2,4-diethylthioxanthone, 2-isopropylthioxanthone, etc.); anthracene compounds such as anthracene and alkoxy-group-containing anthracenes (e.g., dibutoxyanthracene); and phenothiazine and rubrene.

In the case where the composition for liquid crystal cured film form ion contains a sensitizer, the polymerization reaction of the polymerizable liquid crystal compound contained in the composition for liquid crystal cured film formation can be further promoted. The amount of sensitizer used is preferably 0.1 to 30 parts by mass relative to 100 parts by mass of the content of the polymerizable liquid crystal compound, more preferably 0.5 to 10 parts by mass, and still more preferably 0.5 to 8 parts by mass.

<Polymerization Inhibitor>

In order for the polymerization reaction to stably proceed, the composition for liquid crystal cured film formation may contain a polymerization inhibitor. The polymerization inhibitor can control the degree of progress of the polymerization reaction of the polymerizable liquid crystal compound and a polymerizable non-liquid-crystal compound.

Examples of polymerization inhibitors include radical scavengers such as hydroquinone, alkoxy-group-containing hydroquinones, alkoxy-group-containing catechols (e.g., butylcatechol, etc.), pyrogallol, and 2,2,6,6-tetramethyl-1-piperidinyloxy radicals; thiophenols; and β-naphthylamines and β-naphthols.

In the case where the composition for liquid crystal cured film formation contains a polymerization inhibitor, the content is preferably 0.1 to 30 parts by mass relative to 100 parts by mass of the content of the polymerizable liquid crystal compound, more preferably 0.5 to 10 parts by mass, and still more preferably 0.5 to 8 parts by mass. When the content of the polymerization inhibitor is within this range, polymerization can be carried out without disturbing the alignment of the polymerizable liquid crystal compound, and thus this is preferable.

<Leveling Agent>

The composition for liquid crystal cured film formation may contain a leveling agent. A leveling agent functions to adjust the flowability of the composition for liquid crystal cured film formation, thereby further leveling the film resulting from the application of the composition for liquid crystal cured film formation, and may be a surfactant, for example. Preferred examples of leveling agents include leveling agents containing a polyacrylate compound as a main component and leveling agents containing a fluorine-atom-containing compound as a main component.

Examples of leveling agents containing a polyacrylate compound as a main component include "BYK-350", "BYK-352" "BYK-353", "BYK-354", "BYK-355", "BYK-358N", "BYK-361N", "BYK-380", "BYK-381", and "BYK-392" [BYK Chemie].

Examples of leveling agents containing a fluorine-atom-containing compound as a main component include "MEGAFACE® R-08" as well as "R-30", "R-90", "F-410", "F-411", "F-443", "F-445", "F-470", "F-471", "F-477", "F-479", "F-482" and "F-483" [DIC Corporation]; "Surflone S-381" as well as "S-382", "S-383", "S-393" "SC-101", "SC-105", "KH-40", and "SA-100" [AGC Seimi Chemical Co., Ltd.]; "E1830" and "E5844" [Daikin Fine Chemical Laboratory Co., Ltd.]; and "EFTOP EF301", "EF303", "EF351", and "EF352 [Mitsubishi Materials Electronic Chemicals Co., Ltd.]".

In the case where the composition for liquid crystal cured film formation contains a leveling agent, the content is preferably 0.1 parts by mass or more and 5 parts by mass or less relative to 100 parts by mass of the content of the polymerizable liquid crystal compound, more preferably 0.3 parts by mass or more and 5 parts by mass or less, and still more preferably 0.5 parts by mass or more and 3 parts by mass or less. When the content of the leveling agent is within the above range, it is easy to horizontally align the polymerizable liquid crystal compound, and the resulting liquid crystal cured film tends to be smoother, and thus this is preferable. When the content of the leveling agent relative to the polymerizable liquid crystal compound is more than the above range, the resulting liquid crystal cured film tends to be non-uniform, and thus this is undesirable. Incidentally, the composition for liquid crystal cured film formation may contain two or more kinds of leveling agents.

When the liquid crystal cured film has a functional group that forms a chemical bond with the alignment film, the sticking force (F3) between the alignment film and the liquid crystal cured film tends to increase. In addition, when the composition for liquid crystal cured film formation contains a reagent that crosslinks the liquid crystal cured film and the alignment film, F3 tends to increase. Therefore, in order for F3 to be less than 1 N/25 mm, it is preferable that the liquid crystal cured film has fewer functional groups that form a chemical bond with the alignment film, and it is also preferable that the composition for liquid crystal cured film formation does not contain a reagent that crosslinks the alignment film and the liquid crystal cured film. In addition, in order for F3 to be 0.02 N/25 mm or more, these factors should be suitably adjusted.

<Reactive Additive>

The composition for liquid crystal cured film formation may contain a reactive additive. The presence of a reactive additive can increase the sticking force (F3) between the alignment film and the liquid crystal cured film.

As the reactive additive, those having a carbon-carbon unsaturated bond and an active-hydrogen-reactive group in the molecule are preferable. Incidentally, an "active-hydrogen-reactive group" herein means a group reactive to a group having active hydrogen such as a carboxyl group (—COOH), a hydroxyl group (—OH), and an amino group (—NH2). Typical examples thereof include a glycidyl group, an oxo line group, a carbodiimide group, an aziridine group, an imido group, an isocyanate group, a thio isocyanate group, and a maleic anhydride group. The numbers of carbon-carbon unsaturated bonds and active-hydrogen-reactive groups in the reactive additive are each usually 1 to 20, and each preferably 1 to 10.

In the reactive additive, it is preferable that at least two active-hydrogen-reactive groups are present. In this case, the plurality of active-hydrogen-reactive groups may be the same or different from each other.

The carbon-carbon unsaturated bond in the reactive additive may be a carbon-carbon double bond, a carbon-carbon triple bond, or a combination thereof, and a carbon-carbon double bond is preferable. Among them, it is preferable that the reactive additive contains a carbon-carbon unsaturated bond as a vinyl group and/or a (meth)acrylic group. Further, it is preferable that the active-hydrogen-reactive group is at least one member selected from the group consisting of an epoxy group, a glycidyl group, and an isocyanate group. A reactive additive having an acrylic group and an isocyanate group is particularly preferable.

Specific examples of reactive additives include compounds having a (math) acrylic group and an epoxy group, such as methacryloxy glycidyl ether and acryloxy glycidyl ether; compounds having a (meth)acrylic group and an oxetane group, such as oxetane acrylate and oxetane methacrylate; compounds having a (meth)acrylic) acrylic group and a lactone group, such as lactone acrylate and lactone methacrylate; compounds having a vinyl group and an oxazoline group, such as vinyl oxazoline and isopropenyl oxazoline; and oligomers of compounds having a (meth) acrylic group and an isocyanate group, such as isocyanatomethylacrylate, isocyanatomethyl methacrylate, 2-isocyanatoethyl acrylate, and 20 isocyanatoethyl methacrylate. Examples also include compounds having a vinyl group or a vinylene group and an acid anhydride, such as methacrylic anhydride, acrylic anhydride, maleic anhydride, and vinyl-maleic anhydride. Among them, methacryloxy glycidyl ether, acryloxy glycidyl ether, isocyanatomethyl acrylate, isocyanatomethyl methacrylate, vinyloxazoline, 2-isocyanatoethylacrylate, 2-isocyanatoethyl methacrylate, and the above oligomers are preferable, and isocyanatomethyl acrylate, 2-isocyanatoethyl acrylate, and the above oligomers are particularly preferable.

Specifically, a compound represented by the following formula (Y) is preferable.

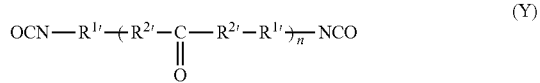

In the formula (Y), n represents an integer of 1 to 10, R1' represents a $C_{2-20}$ divalent aliphatic or alicyclic hydrocarbon group or a $C_{5-20}$ divalent aromatic hydrocarbon group. One of the two R2's in each repeating unit is —NH—, and the other is a group represented by >N—C(=O)—R3'. R3' represents a hydroxyl group or a group having a carbon-carbon unsaturated bond.

At least one R3' of the R3's in the formula (Y) is a group having a carbon-carbon unsaturated bond.]

Among reactive additives represented by the above formula (Y), a compound represented by the following formula (YY) (hereinafter sometimes referred to as compound (YY)) is particularly preferable (incidentally, n is as defined above).

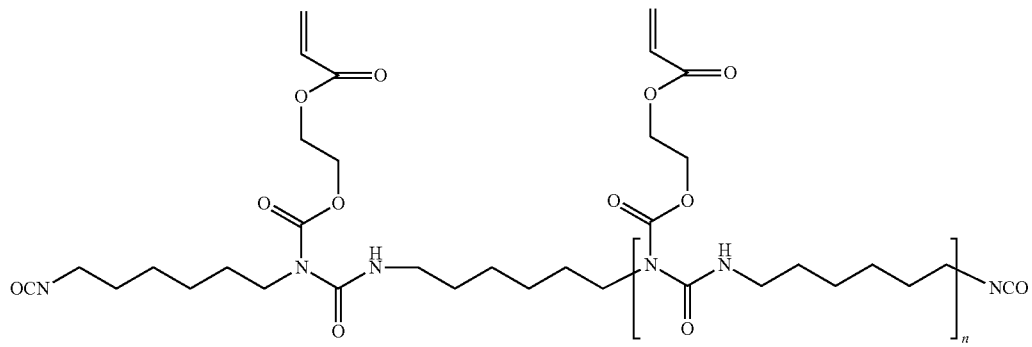

As the compound (YY), a commercially available product can be directly used, or refined as necessary and then used. Examples of commercially available products include Laromer® LR-9000 (manufactured by BASF).

In the case where the composition for liquid crystal cured film formation contains a reactive additive, the content is usually 0.01 to 10 parts by mass, preferably 0.1 to 5 parts by mass, relative to 100 parts by mass of the polymerizable liquid crystal compound.

<Sticky Adhesive Layer>

The sticky adhesive layer is formed from a sticky adhesive. Examples of sticky adhesives include pressure-sensitive adhesives, dry-solidification-type adhesives, and chemical-reaction-type adhesives. Examples of chemical-reaction-type adhesives include active-energy-ray-curable adhesives. The sticky adhesive is preferably a pressure-sensitive adhesive or an active-energy-ray-curable adhesive. The use a pressure-sensitive adhesive or an active-energy-ray-curable adhesive as the sticky adhesive leads to excellent adhesion to the substrate to be transferred, and the retardation function or polarizing function derived from the liquid crystal cured film can be easily imparted to the desired region.

<Pressure-Sensitive Adhesive>

A pressure-sensitive adhesive usually contains a polymer and may also contain a solvent.

Examples of such polymers include acrylic polymers, silicone-based polymers, polyester, polyurethane, or polyether. Among them, an acrylic pressure-sensitive adhesive containing an acrylic polymer has excellent optical transparency, Moderate wettability and cohesive strength, excellent adhesion, and high weather resistance, heat resistance, etc., and is also resistant to lifting, peeling, or the like under heating or moistening conditions. Such a pressure-sensitive adhesive is thus preferable.

A preferred example of the acrylic polymer is a copolymer of a (meth)acrylate in which the alkyl group of its ester moiety is a $C_{20}$ or lower alkyl group such as a methyl group, an ethyl group, or a butyl group (hereinafter, acrylate and methacrylate are sometimes collectively referred to as (methacrylate, and acrylic acid and methacrylic acid are sometimes collectively referred to as (meth)acrylic acid) and a (meth)acrylic monomer having a functional group such as (meth)acrylic acid or hydroxyethyl(meth)acrylate.

A pressure-sensitive adhesive containing such a copolymer has excellent pressure-sensitive adhesion and, at the time of removal after attachment to a display device, can be removed relatively easily without leaving a paste residue or the like on the display device. Such a pressure-sensitive adhesive is thus preferable. The glass transition temperature of the acrylic polymer is preferably 25° C. or less, and more preferably 0° C. or less. The weight average molecular weight of the acrylic polymer is preferably 100,000 or more.

As examples of the solvent, those mentioned above as solvents for the alignable polymer composition can be mentioned.

In addition, the pressure-sensitive adhesive may contain a light diffuser. A light diffuser serves to impart light diffusibility to the pressure-sensitive adhesive and may be in the form of fine particles having a different refractive index from the polymer contained in the pressure-sensitive adhesive. Examples of light diffusers include fine particles of inorganic compounds and fine particles of organic compounds (polymer). Many of polymers contained as active ingredients in the pressure-sensitive adhesive, including the acrylic polymer mentioned above, have a refractive index of about 1.4. Therefore, the light diffuser should be suitably selected from those having a refractive index of about 1 to 2. The refractive index difference between the polymers contained as active ingredients in the pressure-sensitive adhesive and the light diffuser is usually 0.01 or more. The difference is preferably 0.01 or more and 0.5 or less in terms of the brightness and display performance of the display device. It is preferable that the fine particles used as the light diffuser have a spherical shape, close to mono-dispersion. For example, fine particles having an average particle size within a range of about 2 to 6 µm are suitable.

The refractive index is measured by an ordinary minimum deviation method or using an Abbe refractometer.

Examples of fine particles of inorganic compounds include aluminum oxide (refractive index: 1.76) and silicon oxide (refractive index: 1.45).

Examples of fine particles of organic compounds (polymer) include melamine beads (refractive index: 1.57), polymethyl methacrylate beads (refractive index: 1.49), methyl methacrylate/styrene copolymer resin beads (refractive index: 1.50 to 1.59), polycarbonate beads (refractive index: 1.55), polyethylene beads (refractive index: 1.53), polystyrene beads (refractive index: 1.6), polyvinyl chloride beads (refractive index: 1.46), and silicone resin beads (refractive index: 1.46).

The amount of light diffuser incorporated is suitably determined in consideration of the haze value required for the sticky adhesive layer formed from the pressure-sensitive adhesive, the brightness of the display device to which it is applied, etc., and is usually 3 to 30 parts by weight relative to 100 parts by weight of the polymer content.

The haze value of the sticky adhesive layer formed from the pressure-sensitive adhesive having the light diffuser dispersed therein is preferably adjusted to be within a range of 20 to 00% in terms of ensuring the brightness of the display device having applied thereto the present optically anisotropic sheet and also preventing the display image from blurring, etc. Haze value is a value expressed by (diffused transmission/total light transmission)×100(%), and is measured in accordance with JIS K 7105.

The thickness of the pressure-sensitive adhesive layer formed from the pressure-sensitive adhesive is not particularly limited and determined according to its sticking force or the like, but is usually 1 to 40 µm. The thickness is preferably 3 to 25 µm in terms of workability, durability, and the like. When the thickness of the pressure-sensitive adhesive layer formed from the pressure-sensitive adhesive is about 3 to 15 µm, the brightness of the display device as seen from the front or at an angle can be maintained, and also the display image can be prevented from blurring, etc.

<Dry-Solidification-Type Adhesive>

A dry-solidification-type adhesive may contain a solvent.

Examples of dry-solidification-type adhesives include polymers of monomers having a protonic functional group, such as a hydroxyl group, a carboxy group, or an amino group, and an ethylenic unsaturated group. Examples also include compositions containing a urethane resin as a main component and further containing a crosslinking agent or a curable compound such as polyaldehyde, an epoxy compound, an epoxy resin, a melamine compound, a zirconia compound, or a zinc compound.

Examples of polymers of monomers having a protonic functional group, such as a hydroxyl group, a carboxy group, or an amino group, and an ethylenic unsaturated group include an ethylene-maleic acid copolymer, an itaconic acid copolymer, an acrylic acid copolymer, an acryl amide copolymer, a saponified product of polyvinyl acetate, and a polyvinyl alcohol resin.

Examples of polyvinyl alcohol resins include polyvinyl alcohol, partially saponified polyvinyl alcohol, fully saponified polyvinyl alcohol, carboxyl-group-modified polyvinyl alcohol, acetoacetyl-group-modified polyvinyl alcohol, methylol-group-modified polyvinyl alcohol, and amino-group-modified polyvinyl alcohol. The content of the polyvinyl alcohol resin in an aqueous adhesive is usually 1 to 10 parts by weight, preferably 1 to 5 parts by weight, relative to 100 parts by mass of water.

Examples of urethane resins include polyester-based ionomer-type urethane resins. A polyester-based ionomer-type urethane resin herein is an urethane resin having a polyester backbone with a small amount of ionic component (hydrophilic component) introduced thereinto. Such an ionomer-type urethane resin emulsifies in water without using an emulsifier and forms an emulsion, and thus an aqueous adhesive can be obtained. In the case where the polyester-based ionomer-type urethane resin is used, it is effective to incorporate a water-soluble epoxy compound as a crosslinking agent.

Examples of epoxy resins include polyamide epoxy resins obtained by allowing a polyamide polyamine obtained by a reaction between a polyalkylene polyamine, such as diethylenetriamine or triethylenetetramine, with a dicarboxylic acid, such as adipic acid, to react with epichlorohydrin. Examples of commercially available products of such polyamide epoxy resins include "Sumirez Resin 650" and "Sumirez Resin 675" manufactured by Sumika Chemtex Co., Ltd., and "WS-525" manufactured by Japan PMC Co., Ltd. In the case where the epoxy resin is incorporated, the amount to be added is usually 1 to 100 parts by mass, preferably 1 to 50 parts by mass, relative to 100 parts by mass of the polyvinyl alcohol resin.

The thickness of the sticky adhesive layer formed from the dry-solidification-type adhesive is usually 0.001 to 5 μm, preferably 0.01 μm or more, and is preferably 2 or less, and more preferably 1 μm or less. When the sticky adhesive layer formed from the dry-solidification-type adhesive is too thick, the resulting optically anisotropic film is likely to have poor appearance.

<Active-Energy-Ray-Curable Adhesive>

An active-energy-ray-curable adhesive may contain a solvent.

An active-energy-ray-curable adhesive is an adhesive that cures in response to exposure to an active energy ray.

Examples of active-energy-ray-curable adhesives include cation-polymerizable adhesives containing an epoxy compound and a cationic polymerization initiator, radical-polymerizable adhesives containing an acrylic curing component and a radical polymerization initiator, those containing both a cation-polymerizable curing component, such as an epoxy compound, and a radical-polymerizable curing component, such as an acrylic compound, and further containing a cationic polymerization initiator and a radical polymerization initiator, and those that contain no polymerization initiator and cure in response to exposure to an electron beam. Radical-polymerizable active-energy-ray-curable adhesives containing an acrylic curing component and a radical polymerization initiator are preferable. In addition, cation-polymerizable active-energy-ray-curable adhesives containing an epoxy compound and a cationic polymerization initiator, which can be used with substantially no solvent, are preferable.

Examples of epoxy compounds include a glycidyl-etherified product of a hydroxyl-group-containing aromatic compound or linear compound, a glycidyl-aminated product of an amino-group-containing compound, an epoxidized product of a linear compound having a C—C double bond, and an alicyclic epoxy compound having a glycidyloxy group or epoxyethyl group bonded to the saturated carbon ring directly or via alkylene or having an epoxy group bonded directly to the saturated carbon ring. These epoxy compounds may be used alone or in combination. Among them, alicyclic epoxy compounds have excellent cationic polymerization properties and thus are preferable.

As the epoxy compound, commercially available products are easily available. Specific examples thereof include the "jER" series manufactured by Mitsubishi Chemical Corporation, "EPICLON" manufactured by DIC Corporation, "EPOTOHTO®" manufactured by Tohto-Kasei Co., Ltd. "Adeka Resin®" manufactured by ADEKA Corporation, "Denacol®" manufactured by Nagase ChemteX Corporation, "Dow Epoxy" manufactured by Dow Chemical Company, and "TEPIC®" manufactured by Nissan Chemical Industries, Ltd. Examples of alicyclic epoxy compounds include the "Celloxide" series and "Cyclomer" manufactured by Daicel Corporation and the "CYRACURE UVR" series manufactured by Dow Chemical Company.

The active-energy-ray-curable adhesive containing an epoxy compound may further contain compounds other than the epoxy compound. Examples of compounds other than the epoxy compound include oxetane compounds and acryl compounds. Among them, it is preferable to use an oxetane compound together because it may increase the curing rate in cationic polymerization.

Examples of oxetane compounds include the "ARON OXETANE®" series manufactured by Toagosei Co., Ltd, and the "ETERNACOLL®" series manufactured by Ube Industries, Ltd.

It is preferable that the active-energy-ray-curable adhesive containing an epoxy compound or an oxetane compound is used in the absence of solvent.

A cationic polymerization initiator is a compound that generates cationic species in response to exposure to an active energy ray, such as UV radiation. Examples thereof include aromatic diazonium salts; onium salts such as aromatic iodonium salts and aromatic sulfonium salts; and iron-scene complexes. These cationic polymerization initiators may used alone or in combination.

Examples of commercially available products of the cationic polymerization initiator include the "KAYARAD®" series manufactured by Nippon Kayaku Co., Ltd, the "CYRACURE UVI" series manufactured by Dow Chemical Company, the "CPI" series manufactured by San-Apro Ltd., "TAZ", "BBI", and "DTS" manufactured by Midori Kagaku Co., Ltd., the "Adeka Optomer" series manufactured by ADEKA Corporation, and "RHODORSIL®" manufactured by Rhodia.

The content of the cationic polymerization initiator in the active-energy-ray-curable adhesive is usually 0.5 to 20 parts by mass, preferably 1 to 15 parts by mass, relative to 100 parts by mass of the total amount of the active-energy-ray-curable adhesive.

Examples of acrylic curing components include (meth)acrylate and (meth)acrylic acid, such as methyl (meth)acrylate and hydroxyethyl(meth)acrylate.

Examples of radical polymerization initiators include hydrogen-abstraction-type photoradical generators and cleavage-type photoradical generators.

Examples of hydrogen-abstraction-type photoradical generators include naphthalene derivatives such as 1-methylnaphthalene, anthracene derivatives, pyrene derivatives, carbazole derivatives, benzophenone derivatives, thioxanthone derivatives, and coumarin derivatives.

Examples of cleavage-type photoradical generators include arylalkyl ketones such as benzoin ether derivatives and acetophenone derivatives, oxime ketones, acylphosphine oxides, S-phenyl thiobenzoates, titanocenes, and high-molecular-weight derivatives thereof.

Among the cleavage-type photoradical generators, acylphosphine oxides are preferable. Specifically, trimethylbenzoyl diphenylphosphine oxide (trade name: "DAROCURE TPC"; Ciba Japan), bis(2,6-dimethoxy-benzoyl)-(2,4,4-trimethyl-pentyl)-phosphine oxide (trade name: "CGI 403"; Ciba Japan), or bis(2,4,6-trimethylbenzoyl)-2,4-dipentoxyphenylphosphine oxide (trade name: "Irgacure 819"; Ciba Japan) are preferable.

The active-energy-ray-curable adhesive may contain a sensitizer.

In the case where a sensitizer is contained, the content is preferably 0.1 to 20 parts by mass relative to 100 parts by mass of the total amount of the active-energy-ray-curable adhesive.

The active-energy-ray-curable adhesive may further contain an ion-trapping agent, an antioxidant, a chain transfer agent, a tackifies, a thermoplastic resin, a filler, a flow modifier, a plasticizer, a defoaming agent, etc.

In the present invention, an active energy ray is defined as an energy ray that can decompose an active-species-generating compound to generate active species. Examples of such active energy rays include visible light, ultraviolet radiation, infrared radiation, X-rays, α-rays, β-rays, γ-rays, and electron radiation. In the present invention, ultraviolet radiation and electron radiation are usually applied to the active-energy-ray-curable adhesive.

The accelerating voltage for exposure to electron radiation is usually 5 kV to 300 kV, and preferably 10 kV to 250 kV. The exposure dose is usually 5 to 100 kGy, and preferably 10 to 75 kGy.

Exposure to electron radiation is usually performed in an inert gas, but may also be performed in the atmosphere or under the condition that a small amount of oxygen is introduced.

The intensity of exposure to ultraviolet radiation is usually 10 to 5000 mW/cm$^2$. The intensity of exposure to ultraviolet radiation is preferably in a wavelength region effective in the activation of a cationic polymerization initiator or a radical polymerization initiator. It is preferable that exposure is performed at such a light exposure intensity once or multiple times to an integrated light intensity of 10 mJ/cm$^2$ or more, and preferably 10 to 5,000 mJ/cm$^2$.

The light source of ultraviolet radiation may be a low-pressure mercury lamp, a medium-pressure mercury lamp, a high-pressure mercury lamp, an ultrahigh-pressure mercury lamp, a xenon lamp, a halogen lamp, a carbon-arc lamp, a tungsten lamp, a gallium lamp, an excimer laser, an LED source that emits light in a wavelength range of 380 to 440 nm, a chemical lamp, a black light lamp, a microwave-excited mercury lamp, or a metal halide lamp.

Examples of solvents include water; alcohols such as methanol, ethanol, isopropyl alcohol, 1-butanol, 2-buthanol, sec-butyl alcohol, tert-butyl alcohol, ethylene glycol, propylene (glycol, and butanediol;

saturated aliphatic ether compounds such as propyl ether, isopropyl ether, butyl ether, isobutyl ether, n-amyl ether, isoamyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, ethyl n-amyl ether, and ethyl isoamyl ether;

unsaturated aliphatic ether compounds such as allyl ether and ethyl allyl ether;

aromatic ether compounds such as anisole, phenetole, phenyl ether, and benzyl ether;

cyclic ether compounds such as tetrahydrofuran, tetrahydropyran, and dioxane;

ethylene glycol ether compounds such as ethylene glycol monomethyl ether, ethylene glycol monoethyl ether, ethylene glycol monobutyl ether, diethylene glycol monomethyl ether, diethylene glycol monoethyl ether, and diethylene glycol monobutyl ether;

monocarboxylic acid compounds such as formic acid, acetic acid, acetic anhydride, acrylic acid, citric acid, propionic acid, and butanoic acid;

organic acid ester compounds such as butyl formate, amyl formate, propyl acetate, isopropyl acetate, butyl acetate, secondary butyl acetate, amyl acetate, isoamyl acetate, 2-ethylhexyl acetate, cyclohexyl acetate, butyl cyclohexyl acetate, ethyl propionate, butyl propionate, amyl propionate, butyl butyrate, diethyl carbonate, diethyl oxalate, methyl lactate, ethyl lactate, butyl lactate, and triethyl phosphate;

ketone compounds such as acetone, ethyl ketone, propyl ketone, butyl ketone, methyl isopropyl ketone, methyl isobutyl ketone, diisobutyl ketone, acetylacetone, diacetone alcohol, cyclohexanone, cyclopentanone, methylcyclohexanone, and cycloheptanone;

dicarboxylic acid compounds such as succinic acid, glutaric acid, adipic acid, undecanedioic acid, pyruvic acid, and citraconic acid; and 1,4-dioxane, furfural, and N-methylpyrrolidone.

Among them, water and alcohol are preferable, and alcohols having 1 to 4 carbon atoms are more preferable. The solvent is still more preferably at least one alcohol selected from the group consisting of methanol, ethanol, isopropyl alcohol, 1-butanol, 2-buthanol sec-butyl alcohol, tart-butyl ethylene glycol, propylene glycol, and butanediol, and yet more preferably isopropyl alcohol and/or 1-butanol.

Water may be pure water or may also contain impurities to the tap water level.

The thickness of the sticky adhesive layer formed from the active-energy-ray-curable adhesive is usually 0.001 to 5 μm, preferably 0.01 μm or more, and is preferably 2 μm or less, and more preferably 1 μm or less. When the sticky adhesive layer formed from the active-energy-ray-curable adhesive is too thick, the resulting optically anisotropic film is likely to have poor appearance.

The sticking force (F1) between the liquid crystal cured film and the sticky adhesive layer can be adjusted by the kind of sticky adhesive, the thickness of the sticky adhesive layer, and the like.

The sticking force (F1) between the liquid crystal cured film and the adhesive layer is usually 1 N/25 mm or more, and preferably 2 N/25 mm or more, and is preferably 50 N125 mm or less, more preferably 20 N/25 mm or less, and still more preferably 10 N/25 mm or less. In the cage where the sticking force of the sticky adhesive layer is more than 20 N/25 mm, for example, when a release film is attached to the sticky adhesive layer to produce an optically anisotropic sheet made of a laminate of a substrate, an alignment film, a liquid crystal cured film, the sticky adhesive layer, and the release film, and then the release film is removed from the optically anisotropic sheet, because of the high sticking force between the sticky adhesive layer and the release film, it may happen that the sticky adhesive layer and the release film do not separate, but separation occurs in other regions; this is thus undesirable.

The substrate sticking force (34) is preferably 0.02 N/25 mm or more and less than 1 N/25 mm, more preferably 0.04 N/25 mm or more and less than 0.5 N/25 mm, and still more preferably 0.06 N/25 mm or more and less than 0.3 N/25 mm. When F4 is 0.02 N/25 mm or more, separation does not occur between the substrate and the liquid crystal cured film upon the removal of the release film that temporarily protects the sticky adhesive layer, and thus this is preferable. In addition, when 54 is less than 1 N/25 mm, the substrate can be easily removed when transferred to the desired region, and thus this is preferable.

The sticking force (F2) between the substrate and the alignment film is preferably 0.02 N/25 mm or more and less than 1 N/25 mm, more preferably 0.04 N/25 mm or more and less than 0.5 N/25 mm, and still more preferably 0.06 N/25 mm or more and less than 0.3N/25 mm. When F2 is 0.02 N/25 tumor more, separation does net occur between the substrate and the liquid crystal cured film upon the removal of the release film that temporarily protects the sticky adhesive layer, and thus this is preferable. In addition, when F2 is less than 1 N/25 mm, the substrate can be easily removed when transferred to the desired region, and thus this is preferable.

The sticking force (F3) between the alignment film and the liquid crystal cured film is preferably 0.02 N/25 mm or more and less than 1 N/25 mm, more preferably 0.04 N/25 mm or more and less than 0.5 N/25 mm, and still more preferably 0.06 N/25 mm or more and less than 0.3 N/25 ram. When 63 is 0.02 N/25 mm or more, separation does not occur between the substrate and the liquid crystal cured film upon the removal of the release film that temporarily protects the sticky adhesive layer, and thus this is preferable. In addition, when F3 is less than 1 N/25 mm, the substrate can be easily removed when transferred to the desired region, and thus this is preferable.

The sticking force between the substrate and the liquid crystal cured film is preferably 0.02 N/25 mm or more and less than 1 N/25 mm, more preferably 0.04 N/25 mm or more and less than 0.5 N/25 mm, and still more preferably 0.06 N/25 rum or more and less than 0.3 N/25 mm. When the sticking force between the substrate and the liquid crystal cured film is 0.02 N/25 mm or more, separation does not occur between the substrate and the liquid crystal cured film upon the removal of the release film that temporarily protects the sticky adhesive layer, and thus this is preferable. In addition, when the sticking force between the substrate and the liquid crystal cured film is less than 1 N/25 mm, the substrate can be easily removed when transferred to the desired region, and thus this is preferable.

<Optically Anisotropic Sheet Production Method>

The method for applying the composition for liquid crystal cured film formation to the surface of the substrate or the surface of the alignment film formed on the substrate may be the same as those mentioned as methods for applying the alignable polymer composition to the substrate, for example. The thickness of the composition for liquid crystal cured film formation to be applied is determined in consideration of the thickness of the liquid crystal cured film to be obtained.

Next, the solvent contained in the composition for liquid crystal cured film formation is removed under the conditions where the polymerizable liquid crystal compound is not polymerized, thereby forming a dry film of the composition for liquid crystal cured film formation on the surface of the substrate or the alignment film. The method for removing the solvent may be a natural drying method, a ventilation drying method, a heat drying method, a reduced-pressure drying method, or the like, for example.

The dry film is heated, for example, to cause liquid crystal alignment in the polymerizable liquid crystal compound contained in the dry film, and then the dry film is exposed to energy while maintaining the liquid crystal alignment, whereby the polymerizable liquid crystal compound is polymerized. In the case where the composition for liquid crystal cured film formation contains a polymerization initiator, it is preferable that the dry film is exposed to energy under the conditions where the polymerization initiator is activated. In the case where the polymerization initiator is a photopolymerization initiator, it is preferable that the energy is light. The light for exposure is suitably selected according to the kind of polymerization initiator contained in the dry film or the kind of polymerizable liquid crystal compound (particularly the kind of polymerizable group in the polymerizable liquid crystal compound) and its amount. The light may be selected from the group consisting of visible light, ultraviolet light, and laser light, or may also be activate electron radiation, for example. Among them, ultraviolet light is preferable because the progress of the polymerization reaction can be easily controlled, and also as the device involved in polymerization, those widely used in this field may be used. Accordingly, it is preferable that the kinds of polymerizable liquid crystal compound and polymerization initiator contained in the composition for liquid crystal cured film formation are selected so as to allow for polymerization by ultraviolet light. In addition, at the time of polymerization, together with exposure to ultraviolet light, it is preferable to cool the dry film by an appropriate cooling method to control the polymerization temperature. In the case where the polymerizable liquid crystal compound is polymerized at a lower temperature by such cooling, even when the substrate has low heat resistance, a liquid crystal cured film can be appropriately produced.

In this way, a liquid crystal cured film having liquid crystal alignment is formed on the surface of the substrate or the alignment film. In particular, in the case where the formed liquid crystal cured film contains a dichroic pigment and has smectic-phase liquid crystal alignment (polarizing film), together with the effects of the dichroic pigment, such a film has excellent polarization performance as compared with a conventional polarizing film having nematic-phase liquid crystal alignment. Further, it also has excellent strength as compared with the case of applying only a dichroic pigment or lyotropic liquid crystals.

<Primer Layer>

The present optically anisotropic sheet may have a primer layer between the liquid crystal cured film and the sticky adhesive layer. In the case where a primer layer is present between the liquid crystal cured film and the sticky adhesive layer, of the sticking force between the liquid crystal cured film and the primer and the sticking force between the sticky adhesive layer and the primer layer, the lower sticking force is employed as the sticking force (hi) between the liquid crystal cured film and the sticky adhesive layer.

The primer layer usually contains a transparent resin and is formed from a transparent resin solution. The primer layer can suppress defects in the liquid crystal cured film upon the formation of the sticky adhesive layer. As the transparent resin, those having excellent coating properties as well as excellent transparency and adhesiveness after the formation of the primer layer are preferable.

As a solvent for the transparent resin solution, according to the solubility of the transparent resin, it is possible to use ordinary organic solvents, including aromatic hydrocarbon solvents such as benzene, toluene, and xylene; ketone solvents such as acetone, methyl ethyl ketone, and methyl isobutyl ketone; ester solvents such as ethyl acetate and isobutyl acetate; chlorinated hydrocarbon solvents such as methylene chloride, trichloroethylene, and chloroform; and alcohol solvents such as ethanol, 1-propanol, 2-propanol, and 1-butanol. However, when the primer layer is formed using a transparent resin solution containing an organic solvent, the optical characteristics of the liquid crystal cured film may be affected. Therefore, it is preferable that the primer layer is formed u=sing a solution in which the solvent is water.

The transparent resin may be an epoxy resin. The epoxy resin may be a one-component curable resin or a two-component curable resin. Water-soluble epoxy resins are particularly preferable. Examples of water-soluble epoxy resins include polyamide epoxy resins obtained by allowing a polyamide polyamine obtained by a reaction between a polyalkylene polyamine, such as diethylenetriamine or triethylenetetramine, with a dicarboxylic acid, such as adipic acid, to react with epichlorohydrin. Examples of commercially available products of the polyamide epoxy resin include Sumirez Resin® 650 (30) and Sumirez Resin® 075 available from Sumika Chemtex Co., Ltd.

In the case where the water-soluble epoxy resin is used as the transparent resin, in order to further improve coating properties, it is preferable to use in combination with other water-soluble resins such as polyvinyl alcohol resins. The polyvinyl alcohol resins may be modified polyvinyl alcohol resins, such as partially saponified polyvinyl alcohol, fully saponified polyvinyl alcohol, carboxyl-group-modified polyvinyl alcohol, acetoacetyl-group-modified polyvinyl alcohol, methylol-group-modified polyvinyl alcohol, and amino-group-modified polyvinyl alcohol. Examples of appropriate commercially available products of the polyvinyl alcohol resin include KL-318 (trade name) available from Kuraray Co., Ltd., which is an anionic-group-containing polyvinyl alcohol.

In the case where the primer layer is formed from a solution containing a water-soluble epoxy resin, it is preferable that the epoxy resin is within a range of about 0.2 to 1.5 parts by weight relative to 100 parts by weight of water. In addition, in the case where a polyvinyl alcohol resin is incorporated into this solution, the amount is preferably about 1 to 6 parts by weight relative to 100 parts by weight of water. The thickness of the primer layer is preferably within a range of about 0.1 to 10 μm.

The method for forming the primer layer is not limited, and various known coating methods can be used, such as a direct-gravure method, a reverse-gravure method, a die coating method, a comma coating method, and a bar coating method.

The sticky adhesive layer is formed by applying a sticky adhesive to the surface of the liquid crystal cured film or the primer layer. In the case where the sticky adhesive contains a solvent, the layer is formed by applying the sticky adhesive to the surface of the liquid crystal cured film or the primer layer, and then removing the solvent. In addition, the sticky adhesive layer formed from a pressure-sensitive adhesive may also be formed by a method in which a pressure-sensitive adhesive is applied to the releasing-treated side of a releasing-treated film, then the solvent is removed to form a pressure-sensitive adhesive layer on the releasing-treated side of the releasing-treated film, and the film having a sticky adhesive layer is attached to the surface of the liquid crystal cured film or the primer layer in such a manner that the sticky adhesive layer side is to be the attachment side.

It is preferable that the surface of the liquid crystal cured film or the primer layer on which a sticky adhesive layer is to be formed is previously subjected to a corona discharge treatment. The corona treatment can further improve the adhesiveness between the liquid crystal cured film or the primer layer and the sticky adhesive layer.

The method for applying the sticky adhesive may be the same as those mentioned as methods for applying the alignable polymer composition to the substrate, for example. The method for removing the solvent from the applied sticky adhesive may be the same as those mentioned as methods for removing the solvent from the alignable polymer composition, for example.

<Optically Anisotropic Film Production Method>

An optically anisotropic film is obtained by removing the substrate from the present optically anisotropic sheet. The substrate can be removed by any method. It can be removed by peeling, for example.

<Circularly Polarizing Plate>

In the case where the liquid crystal cured film of the present optically anisotropic sheet is a retardation film, a polarizing film is attached to the sticky adhesive layer of the present optically anisotropic sheet, the substrate is removed, and a sticky adhesive layer is further formed thereon, whereby a circularly polarizing plate including a polarizing plate, a first sticky adhesive layer, a liquid crystal cured film, an alignment film, and a second sticky adhesive layer laminated in this order is obtained. At this time, when the alignment film is removed with the substrate, or the optically anisotropic sheet used has no alignment film, a circularly polarizing plate including a polarizing plate, a first sticky adhesive layer, a liquid crystal cured film, and a second sticky adhesive layer laminated in this order is obtained.

When the substrate is removed from the present optically anisotropic sheet in which the liquid crystal cured film is a retardation film, then a sticky adhesive layer is formed on the alignment film resulting from the removal of the substrate, and a polarizing film is attached thereunto, a circularly polarizing plate including a polarizing plate, a first sticky adhesive layer, an alignment film, a liquid crystal cured film, and a second sticky adhesive layer laminated in this order is obtained. At this time, when the alignment film is removed with the substrate, or the present optically anisotropic sheet used has no alignment film, a circularly polarizing plate including a polarizing plate, a first sticky adhesive layer, a liquid crystal cured film, and a second sticky adhesive layer laminated in this order is obtained.

In the case where the liquid crystal cured film of the present optically anisotropic sheet is a polarizing film, a retardation film is attached to the sticky adhesive layer of the present optically anisotropic sheet, then the substrate is removed, and a sticky adhesive layer is further formed on the surface of the retardation film, whereby a circularly polarizing plate including an alignment film, a liquid crystal cured film, a first sticky adhesive layer, a retardation film, and a second sticky adhesive layer laminated in this order is obtained. At this time, when the alignment film is removed with the substrate, or the present optically anisotropic sheet used has no alignment film, a circularly polarizing plate including a liquid crystal cured film, a first sticky adhesive layer, a retardation film, and a second sticky adhesive layer laminated in this order is obtained.

In addition, when the substrate of the present optically anisotropic sheet in which the liquid crystal cured film is a retardation film is removed, then the present optically anisotropic sheet in which the liquid crystal cured film is a polarizing film is attached to the surface of the alignment film resulting from the removal of the substrate via the sticky adhesive layer of the present optically anisotropic sheet in which the liquid crystal cured film is a polarizing film, and further the remaining substrate is removed, a circularly polarizing plate including a first alignment film, a first liquid crystal cured film, a first sticky adhesive layer, a second alignment film, a second liquid crystal cured film, and a second sticky adhesive layer laminated in this order is obtained. At this time, when the alignment film is removed together with the substrate of the present optically anisotropic sheet in which the liquid crystal cured film is a retardation film, or the optically anisotropic sheet used has no alignment film, a circularly polarizing plate including a first alignment film, a first liquid crystal cured film, a first sticky adhesive layer, a second liquid crystal cured film, and a second sticky adhesive layer laminated in this order is obtained. In addition, when the alignment film is removed together with the substrate of the present optically anisotropic sheet in which the liquid crystal cured film is a polarizing film, or the optically anisotropic sheet used has no alignment film, a circularly polarizing plate including a first liquid crystal cured film, a first sticky adhesive layer, a second alignment film, a second liquid crystal cured film, and a second sticky adhesive layer laminated in this order is obtained. In addition, when the alignment film is removed together with the substrate of the present optically anisotropic sheet in which the liquid crystal cured film is a retardation film and the substrate of the present optically anisotropic sheet in which the liquid crystal cured film is a polarizing film, or the optically anisotropic sheet used has no alignment film, a circularly polarizing plate including a first liquid crystal cured film, a first sticky adhesive layer, a second liquid crystal cured film, and a second sticky adhesive layer laminated in this order is obtained.

<Sticking Force Measurement Method>

The sticking force of the present optically anisotropic sheet is measured as follows.

A test piece having a width of 25 mm×a length of about 150 mm is cut from the present optically anisotropic sheet, and the sticky adhesive layer side thereof is attached to a glass plate. Subsequently, using a tensile tester, a lengthwise end of the test piece (the 25-mm-wide side) is held and subjected to a 90° peel test in accordance with JIS K 6854-1: 1999 "Adhesive, Peel Strength Test Method, Part 1: 90° Peel" in an atmosphere having a temperature of 23° C. and a relative humidity of 60% at a crosshead speed (clamp movement speed) of 200 mm/ruin. In the case where the sticking force (F1) between the liquid crystal cured film and the sticky adhesive layer is greater than the substrate sticking force (F4), separation occurs between the substrate and the alignment film, between the alignment film and the liquid crystal cured film, or between the substrate and the liquid crystal cured film. In addition, in the case where the sticking force (F1) between the liquid crystal cured film and the sticky adhesive layer is greater than the sticking force (F2) between the substrate and the alignment film or the sticking force (F3) between the alignment film and the liquid crystal cured film, separation occurs between the substrate and the alignment film or between the alignment film and the liquid crystal cured film.

On the contrary, in the case where the sticking force (F1) between the liquid crystal cured film and the sticky adhesive layer is smaller than the substrate sticking force (F4), separation occurs between the liquid crystal cured film and the sticky adhesive layer. In addition, in the case where the sticking force (F1) between the liquid crystal cured film and the sticky adhesive layer is smaller than the force (F2) between the substrate and the alignment film and the sticking force (F3) between the alignment film and the liquid crystal cured film, separation occurs between the liquid crystal cured film and the sticky adhesive layer. Incidentally, the lowest sticking force among (F2), (F3), and the sticking force between the substrate and the liquid crystal cured film (unit: N/25 mm) is taken as the sticking force of the present optically anisotropic sheet.

<Use of Optically Anisotropic Sheet>

The optically anisotropic sheet of the present invention can be used for the production of various display devices. Specifically, when the present optically anisotropic sheet is attached to the display surface of a display device, and then the substrate is removed, a display device equipped with an optically anisotropic film is obtained.

In addition, when a retardation film is attached to the display surface of a display device via an adhesive layer, then the present optically anisotropic sheet in which the liquid crystal cured film is a polarizing film is attached thereto via the sticky adhesive layer of the present optically anisotropic sheet, and the substrate is removed, a display device equipped with an optically anisotropic film (circularly polarizing plate) is obtained.

In addition, when the present optically anisotropic sheet in which the liquid crystal cured film is a retardation film is attached to the display surface of a display device, then the substrate is removed from the present optically anisotropic sheet, a sticky adhesive layer is further formed on the liquid crystal cured film resulting from the removal of the substrate, and a polarizing film is attached thereto via the sticky adhesive layer, a display device equipped with an optically anisotropic film (circularly polarizing plate) is obtained.

In addition, when the present optically anisotropic sheet in which the liquid crystal cured film is a retardation film is attached to the display surface of a display device, then the substrate is removed from the present optically anisotropic sheet, the present optically anisotropic sheet in which the liquid crystal cured film is a polarizing film is further attached thereto via the sticky adhesive layer of the present optically anisotropic sheet, and the substrate is removed, a display device equipped with an optically anisotropic film (circularly polarizing plate) is obtained.

A display device is a device having display elements and includes a light-emitting element or a light-emitting device as the light source. Examples of display devices include a liquid crystal display device, an organic electroluminescence (EL) display device, an inorganic electroluminescence (EL) display device, an electron emission display device (e.g., a field emission display device (FED), a surface field emission display device (SED)), an electronic paper (a display device using an electronic ink or an electrophoretic element), a plasma display device, a protection-type display device (e.g., a grating light valve (GLV) display device, a display device with a digital micromirror device (DMD)), and a piezoelectric ceramic display. Liquid crystal display devices include any one of transmissive liquid crystal display devices, transflective liquid crystal display devices, reflective liquid crystal display devices, direct-viewing liquid crystal display devices, and projection-type liquid crystal display devices. Such a display device may be a display device that displays two-dimensional images and may also be a stereoscopic display device that displays three-dimensional images.

The present optically anisotropic sheet is particularly effective for use in the production of an organic electroluminescence (EL) display device and an inorganic electroluminescence (EL) display device.

FIG. 1 is a schematic diagram showing the cross-sectional structure of a liquid crystal display device 10 produced using the present optically anisotropic sheet (hereinafter sometimes referred to as "present liquid crystal display device"). A liquid crystal layer 17 is sandwiched between two substrates 14a and 14b.

Figure 4:
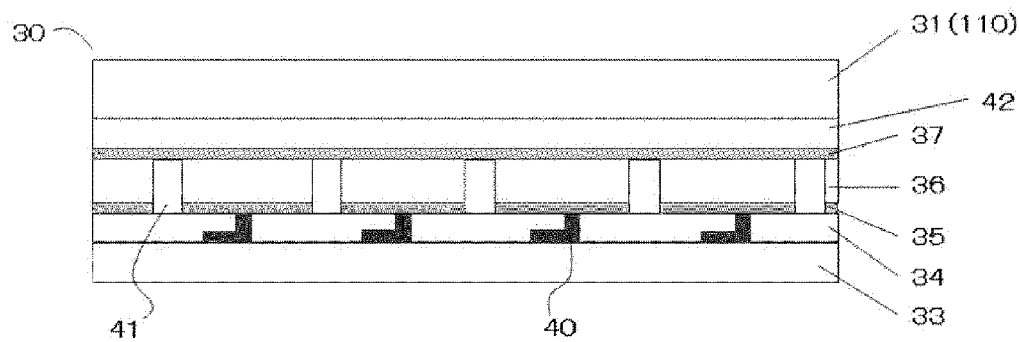
FIG. 4 is a schematic diagram of an EL display device using a circularly polarizing plate including an optically anisotropic film obtained from the optically anisotropic sheet of the present invention.

FIG. 4 is a schematic diagram showing the cross-sectional structure of an EL display device produced using the present optically anisotropic sheet (hereinafter sometimes referred to as "present EL display device").

First, the present liquid crystal display device 10 shown in FIG. 1 will be described.

Or the liquid crystal layer 17 side of the substrate 14a, a color filter 15 is disposed. The color filter 15 is disposed in a position facing a pixel electrode 22 across the liquid crystal layer 17, and a black matrix 20 is disposed in a position facing the boundary between pixel electrodes. A transparent electrode 16 is disposed on the liquid crystal layer 17 side to cover the color filter 15 and the black matrix 20. Incidentally, there may be an overcoating layer (not shown) between the color filter 15 and the transparent electrode 16.

On the liquid crystal layer 17 side of the substrate 14b, a thin-film transistor 21 and the pixel electrode 22 are disposed regularly. The pixel electrode 22 is disposed in a position facing the color filter 15 across the liquid crystal layer 17. Between the thin-film transistor 21 and the pixel electrode 22, an interlayer insulating film 18 having a connecting hole (not shown) is disposed.

As the substrate 14a and the substrate 14b, glass substrates and plastic substrates are used. Such glass substrates and plastic substrates may be the same as those mentioned as examples of the substrate of the present optically anisotropic sheet. In the case where a step of heating to a high temperature is required in the production of the color filter 15 or the thin-film transistor 21 formed on the substrate, glass substrates and quartz substrates are preferable.

An optimal thin-film transistor can be employed according to the material of the substrate 14b. The thin-film transistor 21 may be a high-temperature polysilicon transistor formed on a quartz substrate, a low-temperature polysilicon transistor formed on a glass substrate, or an amorphous silicon transistor formed on a glass substrate or a plastic substrate. A driver IC may be formed on the substrate 14b in order to further miniaturize the present liquid crystal display device.

The liquid crystal layer 17 is disposed between the transparent electrode 16 and the pixel electrode 22. The liquid crystal layer 17 has disposed therein a spacer 23 in order to keep a constant distance between the substrate 14a and the substrate 14b. Incidentally, although FIG. 1 shows a columnar spacer, the spacer shape is not limited to columnar, and any shape is possible as long as a constant distance can be kept between the substrate 14a and the substrate 14b.

The parts are laminated in the following order: the substrate 14a, the color filter 15 and the black matrix 20, the transparent electrode 16, the liquid crystal layer 17, the pixel electrode 22 the interlayer insulating film 16 and the thin-film transistor 21, and the substrate 14b.

With respect to the substrate 14a and the substrate 14b sandwiching the liquid crystal layer 17, polarizing films 12a and 12b are provided outside the substrate 14a and the substrate 14b, respectively, and the present optically anisotropic film obtained by removing the substrate from the present optically anisotropic sheet is used as at least one of such polarizing films. It is preferable that retardation films (e.g., ¼ wave plates or optical compensation films) 13a and 13b are further laminated, and the present optically anisotropic film obtained by removing the substrate from the optically anisotropic sheet of the present invention is used as at least one of such retardation films. These present optically anisotropic films can provide the present liquid crystal display device 10 with the function of converting incident light to linearly polarized light. Incidentally, depending on the structure of the liquid crystal display device and the kind of liquid crystal compound contained in the liquid crystal layer 17, the retardation films 13a and 13b may not be disposed.

As mentioned above, the present optically anisotropic film obtained by removing the substrate from the optically anisotropic sheet of the present invention can be used as the polarizing films 12a and/or 12b and/or the retardation films 13a and/or 13b of the present liquid crystal display device 10 of FIG. 1. When the present optically anisotropic film obtained by removing the substrate from the optically anisotropic sheet of the present invention is provided as the polarizing films 12a and/or 12b and/or the retardation films 13a and/or 13b, the present liquid crystal display device 10 can be further thinned.

A back light unit 19 to serve as a light source is disposed outside the polarizing film 12b. The back light unit 19 includes a light source, a light guide, a reflection plate, a diffusion sheet, and a viewing-angle adjustment sheet. The light source may be an electroluminescence, a cold-cathode tube, a hot-cathode tube, alight-emitting diode (LED), a laser light source, a mercury lamp, or the like. In addition, the kind of present polarizing film can be selected according to the characteristics of such a light source.

In the case where the present liquid crystal display device 10 is a transmissive liquid crystal display device, white light emitted from the light source in the back light unit 20 enters the light guide, turned by the reflection plate, and diffused by the diffusion sheet. The diffused light is adjusted by the viewing-angle adjustment sheet to have the desired directivity, and then enters the polarizing film 12b from the back light unit 19.

Of unpolarized incident light rays, only linearly polarized light in a certain direction transmits through the polarizing film 12b of the liquid crystal panel. The linearly polarized light successively transmits through the substrate 14b, the pixel electrode 22, etc., and reaches the liquid crystal layer 17.

Here, the alignment state of the liquid crystal molecules contained in the liquid crystal layer 17 changes depending on whether there is an electric potential difference between the pixel electrode 22 and the opposed transparent electrode 16, whereby the luminance of the light emitted from the present liquid crystal display device 10 is controlled. In the case where the liquid crystal layer 17 is in the alignment state that allows the polarized light to transmit as it is, the light that has transmitted through the liquid crystal layer 17, the transparent electrode 16, and the color filter 15 is absorbed by the polarizing film 12a. As a result, the pixel displays black.

On the contrary, in the case where the liquid crystal layer 17 is in the alignment state that converts the transmitting polarized light, the polarized light transmits through the liquid crystal layer 17 and the transparent electrode 16, and light in a specific wavelength range transmits through the color filter 15 and reaches the polarizing film 12a. As a result, the liquid crystal display device displays the color, which is determined by the color filter, most brightly. In the intermediate alignment state between these two states, the luminance of light emitted from the present liquid crystal display device 10 is also intermediate between the two. As a result, the pixel displays an intermediate color.

Figure 2:
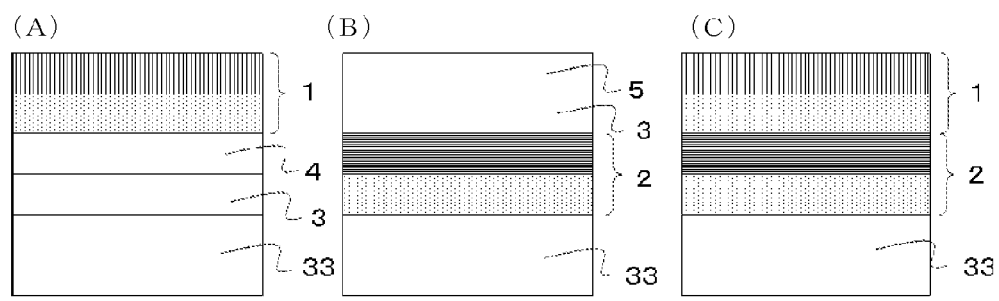
FIG. 2 is a schematic cross-sectional view of a circularly polarizing plate including an optically anisotropic film obtained from the optically anisotropic sheet of the present invention.
Figure 3:
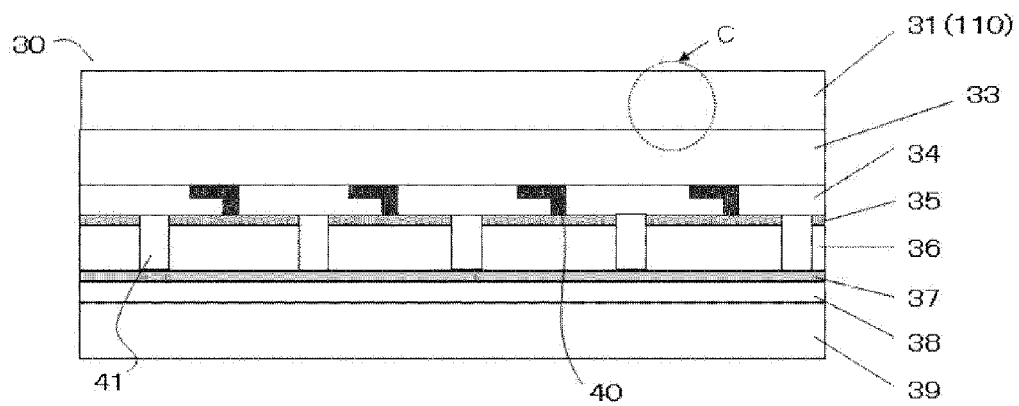
FIG. 3 is a schematic diagram of an EL display device using circularly polarizing plate including an optically anisotropic film obtained from the optically anisotropic sheet of the present invention.

Next, the present EL display device 30 will be described with reference to FIG. 3 and FIG. 4. In the case where an EL display device is produced using the optically anisotropic sheet of the present invention, it is preferable that the optically anisotropic sheet of the present invention is formed into a circularly polarizing plate (hereinafter sometimes referred to as "present circularly polarizing plate") and then used. The present circularly polarizing plate usually has three embodiments. First, the three embodiments of the present circularly polarizing plate will be described with reference to FIG. 2.

FIG. 2(A) is a schematic diagram showing the first embodiment of the present circularly polarizing plate. The first embodiment is an organic EL display device obtained as follows: the present optically anisotropic sheet in which the liquid crystal cured film is a polarizing film is attached onto a retardation film (¼ wave plate) 4, and then the substrate of the present optically anisotropic sheet is removed to transfer a layer 1 made of the optically anisotropic film, which is a polarizing film, and the sticky adhesive layer. At this time, it is possible that the retardation film is first formed on a substrate 33 of the organic EL display device via a sticky adhesive 3, and then the present optically anisotropic sheet is attached thereto. Alternatively, it is also possible that the retardation film and the present optically anisotropic sheet are previously attached together, and then the two are attached to the substrate 33 of the organic EL display device via the sticky adhesive 3.

FIG. 2(B) is a schematic diagram showing the second embodiment of the present circularly polarizing plate. The second embodiment is an organic EL display device obtained as follows: the present optically anisotropic sheet in which the liquid crystal cured film is a retardation film is attached onto a substrate 33 of an organic EL display device, then the substrate of the present optically anisotropic sheet is removed to transfer a layer 2 made of the optically anisotropic film, which is a retardation film, and the sticky adhesive layer, and further a polarizing film 5 is attached to the attached optically anisotropic film via a sticky adhesive 3.

FIG. 2(C) is a schematic diagram showing the third embodiment of the present circularly polarizing plate. The third embodiment is an organic EL display device obtained as follows: the present optically anisotropic sheet in which the liquid crystal cured film is a retardation film is attached to a substrate 33 of an organic EL display device, then the substrate of the present optically anisotropic sheet is removed to transfer the resulting layer 2 made of the optically anisotropic film, which is a retardation film, and the sticky adhesive layer, further the present optically anisotropic sheet in which the liquid crystal cured film is a polarizing film is attached onto the layer 2, and the substrate of the present optically anisotropic sheet is removed to transfer a layer 1 made of the optically anisotropic film, which is a polarizing film, and the sticky adhesive layer.

Next, the present EL display device produced using the present optically anisotropic sheet of the present invention will be described with reference to FIG. 3.

The present EL display device 30 has an organic functional layer 36, which is a light-emitting source, and a cathode electrode 37 laminated on a substrate 33 on which a pixel electrode 35 is formed. A circularly polarizing plate 31 is disposed on the side opposite from the organic functional layer 36 across the substrate 33. The present circularly polarizing plate is used as such a circularly polarizing plate 31. A plus voltage is applied to the pixel electrode 35 and a minus voltage is applied to the cathode electrode 37, and a direct current is applied between the pixel electrode 35 and the cathode electrode 37, whereby the organic functional layer 36 emits light. The organic functional layer 36, which is a light-emitting source, includes an electron transport layer, a light-emitting layer, a hole transport layer, or the like. The light emitted from the organic functional layer 36 transmits through the pixel electrode 35, an interlayer insulating film 34, the substrate 33, and the circularly polarizing plate 31. An organic EL display device having the organic functional layer 36 has been described, but the present invention may also be applied to an inorganic EL display having an inorganic functional layer.

In order to produce the present EL display device 30, first, a thin-film transistor 40 of the desired shape is formed on the substrate 33. Then, the interlayer insulating film 34 is formed, and subsequently the pixel electrode 35 is formed by sputtering and patterned. Subsequently, the organic functional layer 36 is laminated.

Subsequently, the circularly polarizing plate 31 is provided on the substrate 33 on the side opposite to the side where thin-film transistor 40 is provided.

The substrate 33 may be a ceramic substrate such as a sapphire glass substrate, a quartz glass substrate, a soda glass substrate, and an alumina; a copper or like metal substrate; or a plastic substrate. Although this is not shown in the figure, a thermally conductive film may be formed on the substrate 33. The thermally conductive film may be a diamond thin film (PLC, etc.) or the like. In the case where the pixel electrode 35 is reflective, light is emitted in the opposite direction from the substrate 33. Therefore, not only transparent materials but also impermeable materials, such as stainless steel, can be used. The substrate may be formed alone or may also be formed as a laminate substrate made of a plurality of substrates bonded together by a sticky adhesive. In addition, such a substrate is not limited to a plate and may also be a film.

As the thin-film transistor 40, a polycrystalline silicon transistor may be used, for example. The thin-film transistor 40 is provided at the end portion of the pixel electrode 35 and has a size of about 10 to 30 μm. Incidentally, the size of the pixel electrode 35 is about 20 μm×20 μm to 300 μm×300 μm.

On the substrate 33, a wire electrode of the thin-film transistor 40 is disposed. The wire electrode has low resistance and functions to electrically connect with the pixel electrode 35 to keep resistance low. Generally, a wire electrode containing one or more kinds of Al, Al and transition metals (except for Ti), and Ti or titanium nitride (TiN) is used.

The interlayer insulating film 34 is provided between the thin-film transistor 40 and the pixel electrode 35. The interlayer insulating film 34 may be any one as long as it has insulating properties, such as a film formed by the sputtering or vacuum deposition of an inorganic material such as silicon oxide including $SiO_2$ or silicon nitride, a silicon oxide layer formed by SOG (Spin-On-Glass), a photoresist, and a coating film of a resin material such as polyimide or acrylic resin.

A rib 41 is formed on the interlayer insulating film 34. The rib 41 is disposed around the pixel electrode 35 (between adjacent pixels). The material of the rib 41 may be acrylic resin, polyimide resin, or the like. The thickness of the rib 41 is preferably 1.0 μm or more and 3.5 μm or less, and more preferably 1.5 μm or more and 2.5 μm or less.

Next, an EL element including the pixel electrode 35 which is a transparent electrode, the organic functional layer 36 which is a light-emitting source, and the cathode electrode 37 will be described. The organic functional layer 36 has at least one hole transport layer and at least one light-emitting layer, and successively includes, for example, an electron injection/transport layer, a light-emitting layer, a hole transport layer, and a hole injection layer.

The pixel electrode 35 may be ITO (tin-doped indium oxide IZO (zinc-doped indium oxide), IGZO, ZnO, $SnO_2$, $In_2O_3$, or the like, for example, and ITO and IZO are particularly preferable. The thickness of the pixel electrode 35 should be equal to or more than a certain level to allow for sufficient hole injection, and is preferably about 10 to 500 nm.

The pixel electrode 35 can be formed by a vapor deposition method (preferably a sputtering method). The sputtering gas is not particularly limited, and it is possible to use an inert gas, such as Ar, He, Ne, Kr, and Xe, or a mixed gas thereof.

The constituent materials of the cathode electrode 37 may be metal elements such as K, Li, Na, Mg, La, Ce, Ca, Sr, Ba, Al, Ag, In, Sn, Zn, and Zr. In order to improve the operation stability of the electrode, it is preferable to use an alloy system made of two or three components selected from the metal elements mentioned above. Preferred examples of alloy system include Ag—Mg (Ag: 1 to 20 at %), Al—Li (Li: 0.3 to 14 at %) In—Mg (Mg: 50 to 80 at %), and Al—Ca (Ca: 5 to 20 at %).

The cathode electrode 37 is formed by a vapor deposition method, a sputtering method, or the like. The thickness of the cathode electrode 37 is 0.1 nm or more, and preferably 1 to 500 nm or more.

The hole injection layer has the function of facilitating the injection of holes from the pixel electrode 35, while the hole transport layer has the function of transporting holes and the function of preventing electrons and is also called a charge injection layer or a charge transport layer.

The thickness of the light-emitting layer, the total thickness of the hole injection layer and the hole transport layer together, and the thickness of the electron injection/transport layer are not particularly limited. Although this varies depending on the formation method, the preferred thickness is about 5 to 100 nm. Various organic compounds can be used for the hole injection layer and the hole transport layer. For the formation of the hole injection/transport layer, the light-emitting layer, and the electron injection/transport layer, a vacuum deposition method can be used in terms of being capable of forming a homogeneous thin film.

As the organic functional layer 36 which is a light-emitting source, the following examples are usable: those using emission from an singlet exciton (fluorescence), these using emission from a triplet exciton (phosphorescence), those including one using emission from an singlet exciton (fluorescence) and one using emission from a triplet exciton (phosphorescence), those made of an organic substance, those including one made of an organic substance and one made of an inorganic substance, polymer materials, low-molecular materials, and those including a polymer material and a low-molecular material. However, examples are not limited thereto, and an organic functional layer 36 using any of known various EL element materials can be used for the present EL display device 30.

A desiccant 38 is disposed in the space between the cathode electrode 37 and a sealing lid 39. This is because the organic functional layer 36 is weak to humidity. The desiccant 38 absorbs moisture to prevent the organic functional layer 36 from deterioration.

FIG. 4 is a schematic diagram showing the cross-sectional structure of another mode of the present EL display device 30. This present EL display device 30 has a sealing structure using a thin-film sealing film 42, and the emitted light can be obtained also from the opposite side of the array substrate.

As the thin-film sealing film 42, it is preferable to use a PLC (diamond-like carbon) film made of an electrolytic capacitor film having deposited thereon PLC. A DLC film has the characteristic that the moisture permeability is extremely low, leading to high moisture-proof performance. In addition, it may also be formed by directly depositing a DLC film or the like on the surface of the cathode electrode 37. In addition, the thin-film sealing film 41 may also be formed by laminating a resin film and a thin metal film in a multilayer fashion.

EXAMPLES

Hereinafter, the present invention will be described in further detail through examples. The "%" and "parts" in the examples are % by mass and parts by mass unless otherwise noted.

<Sticking Force Measurement Method>

Using a tensile tester, one lengthwise end of a test piece was held, and sticking force was measured by a 90° peel test in accordance with JIS K 6854-1:1999 "Adhesive, Peel Strength Test Method, Part 1: 90° Peel" in an atmosphere having a temperature of 23° C. and a relative humidity of 60% at a crosshead speed (clamp movement speed) of 200 mm/min. Incidentally, the width of the test piece was 25 mm.

Example 1

Preparation of Composition for Liquid Crystal Cured Film Formation (1)

The following components were mixed, and the obtained mixture was stirred at 60° C. for 1 hour to give a composition for retardation film formation.

The polymerizable liquid crystal compound A1 and the polymerizable liquid crystal compound A2 were synthesized by the method described in JP-A-2010-31223.

Polymerizable liquid crystal compound A1 (80 parts):

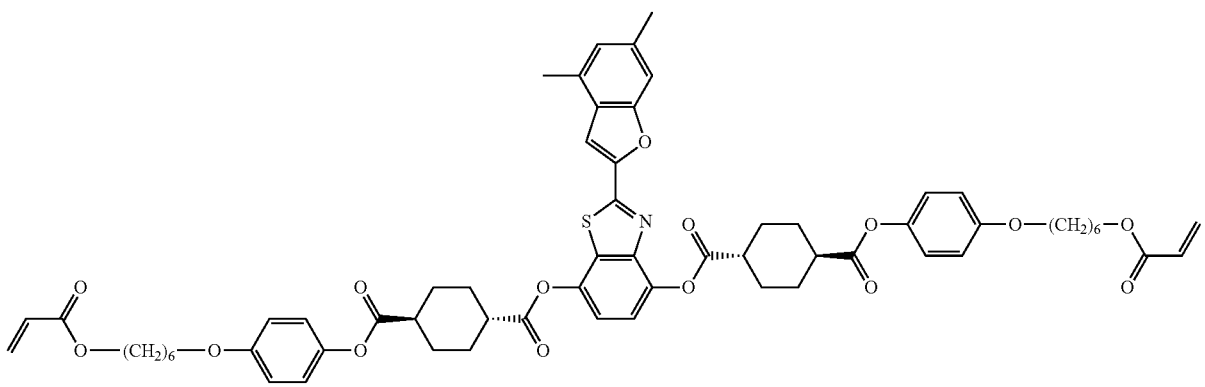

Polymerizable liquid crystal compound A2 (20 parts):

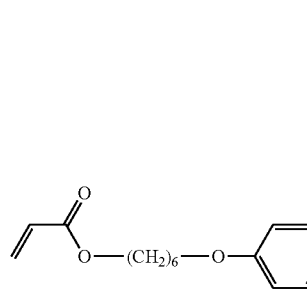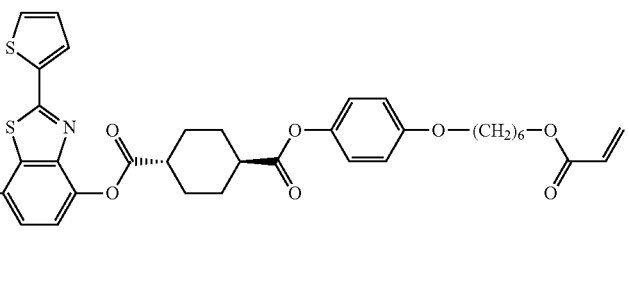

Polymerization initiator (6 parts):
2-Dimethylamino-2-benzyl-1-(4-morpholinophenyl)butan-1-one (IRGACURE® 369; manufactured by Ciba Specialty Chemicals) Leveling agent (0.1 parts): Polyacrylate compound (BYK-361N; manufactured by BYK-Chemie)
Solvent (400 parts): Cyclopentanone
[Preparation of Composition for Photoalignment Film Formation (1)]

The following components were mixed, and the obtained mixture was stirred at 80° C. for 1 hour to give a composition for photoalignment film formation (1).
Photoalignable Material (5 Parts):

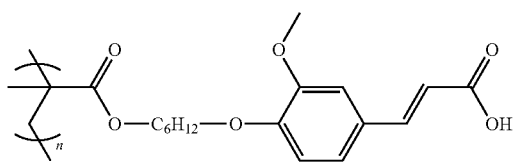

Solvent (95 Parts): Cyclopentanone
[Preparation of Pressure-Sensitive Adhesive]

The following components were mixed in a nitrogen atmosphere at 55° C. to give an acrylic resin.

| | |
|---|---|
| Butyl acrylate | 70 parts |
| Methyl acrylate | 20 parts |
| Acrylic acid | 1.0 part |

Initiator: Azobisisobutyronitrile 0.2 Parts
Solvent (80 Parts): Ethyl Acetate

Further, 0.5 parts of CORONATE® L (a 75% ethyl acetate solution of a trimethylolpropane-addition-product of tolylene diisocyanate, the number of isocyanate groups in one molecule: 3, manufactured by Nippon Polyurethane Industry, Co., Ltd.) and 0.5 parts of a silane coupling agent X-12-961 (manufactured by Shin-Etsu Silicone Co., Ltd.) were mixed, and ethyl acetate was added at last to make the total solids content concentration 10%, thereby giving a pressure-sensitive adhesive.
[Production of Optically Anisotropic Sheet]
1. Formation of Alignment Film A Zeonor® film (manufactured by aeon Corporation), a cycloolefin-based film, was used as a substrate. The substrate was corona-treated, and the composition for photoalignment film formation (1) was applied thereto by a bar coating method, followed by heat-drying in an oven at 60° C. for 1 minute. The obtained dry film was exposed to polarized UV to form a photoalignment film (1) on the substrate surface. The polarized UV treatment was performed using a UV irradiation device (SPOT CURE SP-7; manufactured by Ushio Inc.) under the conditions where the intensity measured at a wavelength of 365 nm was 100 mJ. The obtained photoalignment film (1) had a thickness of 100 nm.
2. Formation of Liquid Crystal Cured Film The composition for liquid crystal cured film formation (1) was applied to the surface of the photoalignment film (1) by a bar coating method, heat-dried in an oven at 120° C. for 1 minute, and then cooled to room temperature to give a dry film. The obtained dry film was exposed to ultraviolet radiation at an exposure dose of 1000 mJ/cm$^2$ (at 365 nm) using a UV irradiation device (SPOT CURE SP-7; manufactured by Ushio, Inc.) to give a liquid crystal cured film (1) cured with a polymerizable liquid crystal compound aligned in the direction horizontal to the substrate plane. The thickness of the formed liquid crystal cured film was measured by a laser microscope (OLS3000 manufactured by Olympus Corporation). The result was 2.0 μm.
3. Production of Pressure-Sensitive Adhesive with Release Film The pressure-sensitive adhesive was applied to the releasing-treated side of a releasing-treated polyethylene terephthalate film (manufactured by Lintec Corporation) using an applicator to a dry thickness of 10 μm, and then dried at 100° C. for 1 minute to give a pressure-sensitive with a release film (1).

The pressure-sensitive adhesive was pressure-bonded to a corona-treated Zeonor® film, and then the obtained film was cut to a size of 25 mm×150 mm and, after the removal of the release film, pressure-bonded onto a glass substrate [Eagle XG (trade name) manufactured by Corning Incorporated]. Subsequently, the Zeonor® film was removed, whereby separation occurred between the glass substrate and the pressure-sensitive adhesive. The peeling force at this time was measured by the sticking force measurement method mentioned above. The result was 4 N/25 nm.
4. Formation of Pressure-Sensitive Adhesive Layer The pressure-sensitive adhesive side of the pressure-sensitive adhesive with a release film (1) was pressure-bonded to the surface of the liquid crystal cured film (1) to give an optically anisotropic sheet (1).
5. Retardation Measurement The optically anisotropic sheet (1) was cut to a size of 30 mm×30 mm, and the release-film-removed side thereof was pressure-bonded to a glass substrate [Eagle XG (trade name) manufactured by Corning Incorporated]. Subsequently, the substrate of the optically anisotropic sheet was removed to give a measurement sample. The retardation values of the measurement sample were measured using a measuring device (KOBRA-WR manufactured by Oji Scientific Instruments) in a wavelength range of 450 to 700 nm. The retardation value Re(450) at a wavelength of 450 nm, the retardation value Re(550) at a wavelength of 550 nm, and the retardation value Re(650) at a wavelength of 650 nm were calculated by the program attached to the device. The results were as follows.

Re(450)–134 nm

Re(550)=145 nm

Re(650)=151 nm

Re(450)/Re(550)=0.93

Re(650)/Re(550)=1.04

6. Transfer of Optically Anisotropic Film

The optically anisotropic sheet (1) was cut to a size of 25 mm×150 mm and, after the removal of the release film, pressure-bonded onto a glass substrate [Eagle XG (trade name) manufactured by Corning Incorporated]. Subsequently, the substrate of the optically anisotropic sheet (1) was removed to transfer an optically anisotropic film onto the glass. The thickness of the optically anisotropic film including the pressure-sensitive adhesive at this time was 12 μm.

The sticking force (F1) between the liquid crystal cured film and the pressure-sensitive adhesive layer was greater than the sticking force (F2) between the substrate and the alignment film and the sticking force (F3) between the alignment film and the liquid crystal cured film, and the above (F3) was the smallest. Accordingly, separation occurred between the alignment film and the liquid crystal cured film, and the substrate was removed. The sticking force (F3) was 0.30 N/25 mm. That is, F2 and F3 were 0.02 N/25 mm or more, and F2 or F3 was less than 1 N/25 mm.

Example 2

1. Production of Circularly Polarizing Plate

The optically anisotropic sheet (1) was cut to a size of 40 mm×40 mm and, after the removal of the release film, pressure-bonded to a reflection plate (a mirror-finished aluminum plate. Subsequently, the substrate of the optically anisotropic sheet (1) was removed, and further an iodine-PVA polarizing plate (SUMIKARAN manufactured by Sumitomo Chemical Co., Ltd., 65 μm thick) was attached thereonto via a pressure-sensitive adhesive. At this time, the angle between the slow axis of the optically anisotropic film and the absorption axis of the polarizing plate was made 45°. Thus, a circularly polarizing plate W having a total thickness of 92 μm was obtained.

2. Measurement of Reflectance

In order to confirm the usefulness of the circularly polarizing plate (1), reflectance was measured as follows. Using a spectrophotometer (UV-3150 manufactured by Shimadzu Corporation), light in a wavelength range of 400 to 700 nm was applied in 2 nm steps to the measurement sample at 12° from the normal direction, and the reflectance of the reflected light was measured. As a result of reflectance calculation taking the reflectance measured from a reflection plate disposed alone without the attachment of the circularly polarizing plate (1) as 100%, the reflectance of light in a wavelength range of 400 to 700 nm was about 1 to 10%, showing that sufficient antireflection characteristics can be obtained over the entire visible light range. This antireflection principle is the same as in external light reflection in a metal electrode of an organic EL display, and thus the circularly polarizing plate is also suitable for use in an organic EL display.

Example 3

Preparation of Composition for Liquid Crystal Cured Film Formation (2)

The following components were mixed, and the obtained mixture was stirred at 80° C. for 1 hour to give a composition for liquid crystal cured film formation (2). The polymerizable liquid crystal compound B1 and polymerizable liquid crystal compound B2 were synthesized by the method described in Japanese Patent No. 4719156.

Polymerizable liquid crystal compound B1 (Compound (1-6); 75 parts)

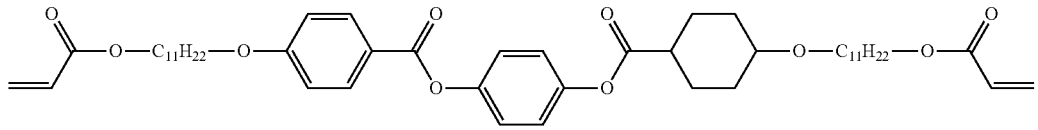

Polymerizable liquid crystal compound B2 (Compound (1-7); 25 parts)

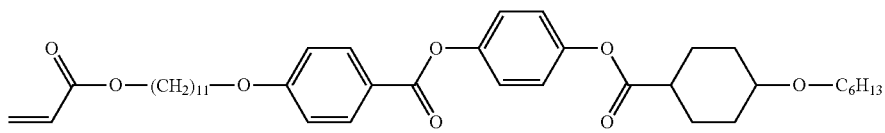

Dichroic pigment; Bis azo compound (2-1-1)  2.5 parts

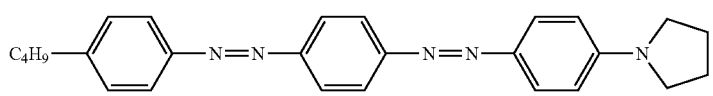

(2-1-1)

| Bis azo compound (2-1-2) | 2.5 parts |
|---|---|

(2-1-2)

| Bis azo compound (2-4-1) | 2.5 parts |
|---|---|

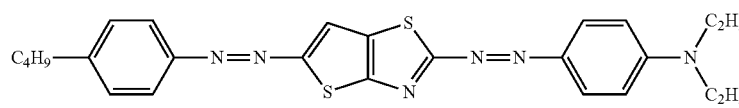

(2-4-1)

| Polymerization initiator; 2-Dimethylamino-2-benzyl-1-(4-morpholinophenyl)butan-1-one (IRGACURE ® 369; manufactured by Ciba Specialty Chemicals) | 6 parts |
|---|---|
| Leveling agent; Polyacrylate compound (BYK-361N; manufactured by BYK-Chemie) | 1.5 parts |
| Solvent; Cyclopentanone | 250 parts |

[Measurement of Phase Transition Temperature]

The composition for liquid crystal cured film formation (2) was applied to glass and dried to give a sample for measurement. The measurement sample was heated to 140° C., and the phase transition temperature at the time of cooling was checked by texture observation under a polarization microscope. As a result, it was confirmed that phase transition to the nematic phase occurs at 108° C., phase transition to the smectic A phase occurs at 101° C., and phase transition to the smectic B phase occurs at 76° C.

[Production of Optically Anisotropic Sheet]

1. Formation of Liquid Crystal Cured Film

The composition for liquid crystal cured film formation (2) was applied by a bar coating method to the surface of a photoalignment film obtained in the same manner as in 1, heat-dried in an oven at 120° C. for 1 minute, and then cooled to room temperature, followed by exposure to ultraviolet radiation at an exposure dose of 1200 mJ/cm² (at 365 nm) using a UV irradiation device (SPOT CURE SP-7; manufactured by Ushio, thereby forming a liquid crystal cured film (2) cured with a polymerizable liquid crystal compound aligned in the direction horizontal to the substrate plane. The thickness of the formed liquid crystal cured film was measured by a laser microscope (OLS3000 manufactured by Olympus Corporation). The result was 1.8 μm.

2. X-Ray Diffraction Measurement

The surface of the liquid crystal cured film thus obtained was subjected to X-ray diffraction measurement using an X-ray diffractometer X'Pert PRO MPD (manufactured by Spectris Co., Ltd.). Using Cu as the target, X-rays generated at an X-ray tube current of 40 mA and an X-ray tube voltage of 45 kV were applied through a fixed divergence slit ½° from the rubbing direction (the rubbing direction of the alignment layer under the polarizing layer is previously determined), and scanning was performed in a scanning range of 2θ=4.0 to 40.0° in 2θ=0.01671° steps to perform the measurement. As a result, a sharp diffraction peak (Bragg peak) having a peak half-width (FWHM) of about 0.29° was obtained near 2θ=20.12°. In addition, also in the measurement in which X-rays were applied from the direction perpendicular to the rubbing direction, the similar results were obtained. The order period (d) determined from the peak position was about 4.4 A, showing that a structure reflecting the higher-order smectic phase had been formed.

3. Formation of Pressure-Sensitive Adhesive Layer

In the same manner as in Example 1, the pressure-sensitive adhesive side of the pressure-sensitive adhesive with a release film (1) was pressure-bonded to the surface of the liquid crystal cured film (2) to give an optically anisotropic sheet (2).

4. Transfer of Optically Anisotropic Film

The optically anisotropic sheet (2) was cut to a size of 25 mm×150 mm and, after the removal of the release film, pressure-bonded onto a glass substrate [Eagle XG (trade name) manufactured by Corning Incorporated]. Subsequently, the substrate of the optically anisotropic sheet was removed to transfer the optically anisotropic film onto the glass. The thickness of the optically anisotropic film including the pressure-sensitive adhesive at this time was 11.8 μm.

The sticking force (F1) between the liquid crystal cured film and the pressure-sensitive adhesive layer was greater than the sticking force (F2) between the substrate and the alignment film and the sticking force (F3) between the alignment film and the liquid crystal cured film, and the above (F3) was the smallest. Accordingly, separation occurred between the alignment film and the liquid crystal cured film, and the substrate was removed. The sticking force (F3) was 0.32 N/25 mm. That is, FT and F3 were 0.02 N/25 mm or more, and F2 or F3 was less than 1 N/25 mm.

Example 4

1. Production of Circularly Polarizing Plate

The pressure-sensitive adhesive with a release film (1) obtained in Example 1 was pressure-bonded to a retardation film (an uniaxially stretched film WRF-S (modified polycarbonate-based resin), retardation value: 141 nm, thickness: 50 μm, manufactured by Teijin Chemicals Ltd.), cut to a size of 40 mm×40 mm, and, after the removal of the release film, pressure-bonded to a reflection plate (a mirror-finished aluminum plate. Further, the optically anisotropic sheet (2) described in Example 3 was pressure-bonded thereonto, and the substrate of the optically anisotropic sheet was removed to transfer the optically anisotropic film onto the retardation film, thereby giving a circularly polarizing plate. At this time, the angle between the slow axis of the retardation film and the absorption axis of the optically anisotropic film was made 45°. Thus, an extremely thin circularly polarizing plate having a total thickness, including the pressure-sensitive adhesive, of 71.8 µm was formed on the reflection plate.

2. Measurement of Reflectance

In order to confirm the usefulness of the circularly polarizing plate (2), reflectance was measured as follows. Using a spectrophotometer (UV-3150 manufactured by Shimadzu Corporation), light in a wavelength range of 400 to 700 nm was applied in 2 nm steps to the measurement sample at 12° from the normal direction, and the reflectance of the reflected light was measured. As a result of reflectance calculation taking the reflectance measured from a reflection plate disposed alone without the attachment of the circularly polarizing plate (2) as 100%, the reflectance of light in a wavelength range of 400 to 700 nm was about 1 to 10%, showing that sufficient antireflection characteristics can be obtained over the entire visible light range. This antireflection principle is the same as in external light reflection in a metal electrode of an organic EL display, and thus the circularly polarizing plate is also suitable for use in an organic EL display.

Example 5

1. Production of Circularly Polarizing Plate

The optically anisotropic sheet (1) obtained in Example 1 was cut to a size of 40 mm×40 mm and, after the removal of the release film, pressure-bonded to a reflection plate (a mirror-finished aluminum plate). Subsequently, the substrate of the optically anisotropic sheet was removed to transfer an optically anisotropic film (1) onto the glass. Further, the release film of the optically anisotropic sheet (2) obtained in Example 3 was removed, and the sheet was attached onto the optically anisotropic film (1) transferred onto the glass. The substrate of the optically anisotropic sheet was then removed to transfer an optically anisotropic film (2) onto the optically anisotropic film (1). At this time, the angle between the slow axis of the optically anisotropic film (1) and the absorption axis of the optically anisotropic film (2) was made 45°. Thus, an extremely thin circularly polarizing plate (3) having a total thickness, including the pressure-sensitive adhesive, of 23.8 µm was formed on the reflection plate.

2. Measurement of Reflectance

In order to confirm the usefulness of the circularly polarizing plate (3), reflectance was measured as follows. Using a spectrophotometer (UV-3150 manufactured by Shimadzu Corporation), light in a wavelength range of 400 to 700 nm was applied in 2 nm steps to the measurement sample at 12° from the normal direction, and the reflectance of the reflected light was measured. As a result of reflectance calculation taking the reflectance measured from a reflection plate disposed alone without the attachment of the circularly polarizing plate (3) as 100%, the reflectance of light in a wavelength range of 400 to 700 nm was about 1 to 10%, showing that sufficient antireflection characteristics can be obtained over the entire visible light range. This antireflection principle is the same as in external light reflection in a metal electrode of an organic EL display, and thus the circularly polarizing plate is also suitable for use in an organic EL display.

Example 6

1. Production of Circularly Polarizing Plate

An optically anisotropic sheet (3) was produced in the same manner as in Example 1, except that a polyethylene terephthalate film was used as a substrate in place of the Zeonor® film. An optically anisotropic sheet (4) was produced in the same manner as in Example 3, except that a polyethylene terephthalate film was used as a substrate in place of the Zeonor® film. Each film was cut to a size of 40 mm×40 mm. After the removal of the release film, the optically anisotropic sheet (3) way pressure-bonded to a reflection plate (a mirror-finished aluminum plate), and then the polyethylene terephthalate film was removed to transfer an optically anisotropic film (3) onto the reflection plate. Further, the optically anisotropic sheet (4) was pressure-bonded thereonto, and the polyethylene terephthalate film was removed to transfer an optically anisotropic film (4) onto the retardation film. At this time, the angle between the slow axis of the optically anisotropic film (3) and the absorption axis of the optically anisotropic film (4) was made 45°. Thus, an extremely thin circularly polarizing plate (4) having a total thickness, including the pressure-sensitive adhesive, of 23.8 was formed on the reflection plate.

2. Measurement of Reflectance

In order to confirm the usefulness of the circularly polarizing plate (4), reflectance was measured as follows. Using a spectrophotometer (UV-3150 manufactured by Shimadzu Corporation), light in a wavelength range of 400 to 700 nm was applied in 2 nm steps to the measurement sample at 12° from the normal direction, and the reflectance of the reflected light was measured. As a result of reflectance calculation taking the reflectance measured from a reflection plate disposed alone without the attachment of the circularly polarizing plate (4) as 100%, the reflectance of light in a wavelength range of 400 to 700 nm was about 1 to 10%, showing that sufficient antireflection characteristics can be obtained over the entire visible light range. This antireflection principle is the same as in external light reflection in a metal electrode of an organic EL display, and thus the circularly polarizing plate is also suitable for use in an organic EL display.

Example 7

Preparation of Active-Energy-Ray-Curable Adhesive

The following components were mixed to prepare an active-energy-ray-curable adhesive (1).

3,4-Epoxycyclohexylmethyl

| | |
|---|---|
| 3,4-epoxycyclohexanecarboxylate | 40 parts |
| Diglycidyl ether of bisphenol A | 60 parts |
| Diphenyl (4-phenylthiophenyl) sulfonium hexafluoroantimonate (cationic photopolymerization initiator) | 4 parts |

[Production of Optically Anisotropic Sheet]
1. Formation of Alignment Film

A polyethylene terephthalate film (DIAFOIL T140E25 manufactured by Mitsubishi Plastics, Inc.) was used as a substrate. The composition for photoalignment film formation (1) was applied to the substrate by a bar coating method and heat-dried in an oven at 60° C. for 1 minute. The obtained dry film was exposed to polarized UV to forma photoalignment film (1) on the substrate surface. The polarized UV treatment was performed using a UV irradiation device (SPOT CURE SP-7; manufactured by Ushio Inc.) under the conditions where the intensity measured at a wavelength of 365 nm was 100 mJ. The obtained photoalignment film (1) had a thickness of 100 nm.

2. Formation of Liquid Crystal Cured Film

The composition for liquid crystal cured film formation (1) was applied to the surface of the photoalignment film (1) by a bar coating method, heat-dried in an oven at 120° C. for 1 minute, and then cooled to room temperature to give a dry film. The obtained dry film was exposed to ultraviolet radiation at an exposure dose of 1000 mJ/cm$^2$ (at 365 nm) using a UV irradiation device (SPOT CURE SP-7; manufactured by Ushio, Inc.) to give a liquid crystal cured film (3) cured with a polymerizable liquid crystal compound aligned in the direction horizontal to the substrate plane. The thickness of the formed liquid crystal cured film was measured by a laser microscope (OLS3000 manufactured by Olympus Corporation). The result was 2.0 μm.

6. Transfer of Optically Anisotropic Film

The surface of the obtained liquid crystal cured film (3) was corona-treated, and the active-energy-ray-curable adhesive (1) as applied thereto by a bar coating method to give an optically anisotropic sheet (5). A Zeonor® film with a corona-treated surface (retardation: 0) was pressure-bonded to the adhesive-side surface of the optically anisotropic sheet (5), and, from the Zeonor® film side, the sheet was exposed to ultraviolet radiation at an exposure dose of 1000 mJ/cm$^2$ (at 365 nm) using a UV irradiation device (SPOT CURE SP-7; manufactured by Ushio, Inc.). The substrate of the optically anisotropic sheet (5) was removed to transfer an optically anisotropic film onto the Zeonor® film, thereby giving a Zeonor® film (10) having an optically anisotropic film. The thickness of this optically anisotropic film including the adhesive layer was 4.5 μm.

The sticking force (F1) between the liquid crystal cured film and the adhesive layer was greater than the sticking force (F2) between the substrate and the alignment film and the sticking force (F3) between the alignment film and the liquid crystal cured film, and the above (F3) was the smallest. Accordingly, separation occurred between the alignment film and the liquid crystal cured film, and the substrate was removed. The sticking force (F3) was 0.08 N/25 mm. That is, F2 and F3 were 0.02 N/25 mm or more, and F2 or F3 was less than 1 N/25 mm.

5. Retardation Measurement

The retardation values of the Zeonor® film (10) having an optically anisotropic film were measured in a wavelength range of 450 to 700 nm using a measuring device (KOBRA-WR manufactured by Oji Scientific Instruments). The retardation value Re(450) at a wavelength of 450 nm, the retardation value Re(550) at a wavelength of 550 nm, and the retardation value Re(650) at a wavelength of 650 nm were calculated by the program attached to the device. The results were as follows. Incidentally, the retardation of the Zeonor® film is substantially 0 and thus does not affect the following retardation values Re.

$Re(450)=121$ nm $Re(550)=130$ nm $Re(650)=135$ nm $Re(450)/Re(550)=0.93$ $Re(650)/Re(550)=1.04$

Example 8

1. Production of Circularly Polarizing Plate

The optically anisotropic sheet (5) obtained in Example 7 and an iodine-PVA polarizing plate (SUMIKARAN manufactured by Sumitomo Chemical Co., Ltd., 65 μm thick) were attached together via an adhesive, and the substrate of the optically anisotropic sheet (5) was removed. At this time, the angle between the slow axis of the optically anisotropic film and the absorption axis of the polarizing plate was made 45°. Thus, a circularly polarizing plate (5) having a total thickness of 93 μm was obtained.

2. Measurement of Reflectance

In order to confirm the usefulness of the circularly polarizing plate (5), reflectance was measured as follows. Using a spectrophotometer (UV-3150 manufactured by Shimadzu Corporation), light in a wavelength range of 400 to 700 nm was applied in 2 nm steps to the measurement sample at 12° from the normal direction, and the reflectance of the reflected light was measured. As a result of reflectance calculation taking the reflectance measured from a reflection plate disposed alone without the attachment of the circularly polarizing plate (5) as 100%, the reflectance of light in a wavelength range of 400 to 700 was about 1 to 10%, showing that sufficient antireflection characteristics can be obtained over the entire visible light range. This antireflection principle is the same as in external light reflection in a metal electrode of an organic EL display, and thus the circularly polarizing plate is also suitable for use in an organic EL display.

Example 9

Preparation of Alignable Polymer Composition (1)

The composition of an alignable polymer composition (1) is shown in Table 1. To SUNEVER SE-610 (manufactured by Nissan Chemical Industries, Ltd.), which is a commercially available alignable polymer, were added N-methyl-2-pyrrolidone, 2-butoxyethanol, and propylene glycol monomethyl ether (PGME) to give a an alignable polymer composition (1).

TABLE 1

| | SE-610 Solids content | N-methyl-pyrrolidone | 2-Butoxy-ethanol | PGME |
|---|---|---|---|---|
| Alignable polymer composition (1) | 0.5% | 4.6% | 1.2% | 93.7% |

The values in Table 1 show the proportions of the respective components relative to the total amount of the prepared composition. With respect to SE-610, the solids content was calculated from the concentration given in the product specification.

[Preparation of Composition for Liquid Crystal Cured Film Formation (3)]

The composition of a composition for liquid crystal cured film formation (3) is shown in Table 2. The respective components were mixed, and the obtained solution was stirred at 80° C. for 1 hour and then cooled to room temperature to give a composition for liquid crystal cured film formation (3).

TABLE 2

|  | Polymerizable liquid crystal compound | Polymerization initiator | Leveling agent | Reaction additive | Solvent |
|---|---|---|---|---|---|
| Composition for liquid crystal cured film formation (3) | LC242 (19.2%) | Irg907 (0.5%) | BYK-361N (0.1%) | LR9000 (1.1%) | PGMEA (79.1%) |

The values in parentheses in Table 2 show the proportions of the respective components relative to the total amount of the prepared composition. In Table 2, LR9000 is Laromer® LR-9000 manufactured by BASF Japan, Irg907 is IRGACURE® 907 manufactured by BASE Japan, BYK361N is a leveling agent manufactured by BYK Japan, LC242 is a polymerizable liquid crystal compound manufactured by BASF represented by the following formula, and FGMEA is propyleneglycol-1-monomethylether-2-acetate.

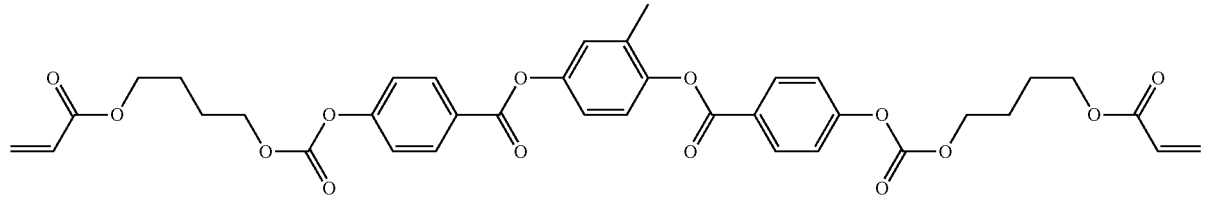

LC242

1. Formation of Alignment Film

A polyethylene terephthalate film (DIAFOIL T140E25 manufactured by Mitsubishi Plastics, Inc.) was used as a substrate. The alignable polymer composition (1) was applied to the substrate by a bar coating method and heat-dried in an oven at 90° C. for 1 minute to form an alignment film (1). The obtained alignment film (1) had a thickness of 40 nm.

2. Formation of Liquid Crystal Cured Film

The composition for liquid crystal cured film formation (3) was applied to the surface of the alignment film (1) using a bar coater and dried at 90° C. for 1 minute, followed by exposure to ultraviolet radiation (in a nitrogen atmosphere, wavelength: 365 nm, integrated light intensity at a wavelength of 365 nm: 1000 mJ/cm$^2$) using a high-pressure mercury lamp (UNICURE VB-15201 BY-A, manufactured by Ushio, Inc.), thereby forming a liquid crystal cured film (4) cured with a polymerizable liquid crystal compound aligned in the direction perpendicular to the substrate plane. The thickness of the formed liquid crystal cured film was measured by a laser microscope. The result was 0.5 μm.

6. Transfer of Optically Anisotropic Film

The surface of the obtained liquid crystal cured film (4) was corona-treated, and then the active-energy-ray-curable adhesive (1) was applied thereto by a bar coating method to give an optically anisotropic sheet (6) A Zeonor® film with a corona-treated surface (retardation: 0) was pressure-bonded to the adhesive-side surface of the optically anisotropic sheet (6), and, from the Zeonor® film side, the sheet was exposed to ultraviolet radiation at an exposure dose of 1000 mJ/cm$^2$ (at 365 nm) using a UV irradiation device (SPOT CURE SP-7; manufactured by Ushio, Inc.). The substrate of the optically anisotropic sheet (6) was removed to transfer an optically anisotropic film onto the Zeonor® film, thereby giving a Zeonor® film (11) having an optically anisotropic film. The thickness of this optically anisotropic film including the adhesive layer was 3.0 μm.

The sticking force (F1) between the liquid crystal cured film and the adhesive layer was greater than the sticking force (F2) between the substrate and the alignment film and the sticking force (F3) between the alignment film and the liquid crystal cured film, and the above (F3) was the smallest. Accordingly, separation occurred between the alignment film and the liquid crystal cured film, and the substrate was removed. The sticking force (F3) was 0.08 N/25 mm. That is, F2 and F3 were 0.02 N/25 mm or more, and F2 or F3 was less than 1 N/25 mm.

5. Retardation Measurement

The retardation values of the Zeonor® film (11) having an optically anisotropic film were measured using a measuring device (KOBRA-WR manufactured by Oji Scientific Instruments). As a result of the measurement of the retardation value at a wavelength of 550 nm, Re(550) was 1 nm, and Rth(550) was −70 nm. That is, the liquid crystal cured film (4) has optical characteristics expressed by the following equation (4). Incidentally, the retardation value of the Zeonor® film at a wavelength of 550 nm is substantially 0, and thus the optical characteristics are not affected.

$$n_z > n_x \approx n_y \quad (4)$$

Example 10

Preparation of Composition for Liquid Crystal Cured Film Formation (4)

The following components were mixed, and the obtained mixture was stirred at 80° C. for 1 hour to give a composition for liquid crystal cured film formation (4).

The polymerizable liquid crystal compound X1 was synthesized by the method described in JP-A-2010-24438.

Polymerizable liquid crystal compound A1 (93 parts):
Polymerizable liquid crystal compound X1 (7 parts):

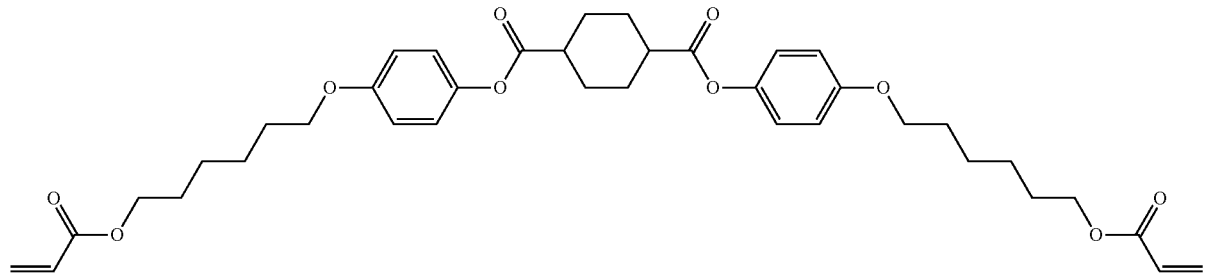 [SMILES: C=CC(=O)OCCCCCCOc1ccc(OC(=O)C2CCC(C(=O)Oc3ccc(OCCCCCCOC(=O)C=C)cc3)CC2)cc1]

Polymerization Initiator (6 parts):
2-Dimethylamino-2-benzyl-1-(4-morpholinophenyl)butan-1-one (IRGACURE® 369; manufactured by Ciba Specialty Chemical Leveling agent (0.1 parts): Polyacrylate compound (BYK-361N; manufactured by BYK-Chemie)
Solvent (800 parts): N-methyl-2-pyrrolidinone
Additive (5 parts): Laromer® LR-9000 (manufactured by BASF)

[Production of Optically Anisotropic Sheet]

1. Formation of Alignment Film

A polyethylene terephthalate film (DIAFOIL T140E25 manufactured by Mitsubishi Plastics, Inc.) was used as a substrate. The composition for photoalignment film formation (1) was applied to the substrate by a bar coating method and heat-dried in an oven at 60° C. for 1 minute. The obtained dry film was exposed to polarized UV to forma photoalignment film (1) on the substrate surface. The polarized UV treatment was performed using a CV irradiation device (SPOT CURE SP-7; manufactured by Ushio Inc.) under the conditions where the intensity measured at a wavelength of 365 nm was 100 mJ. The obtained photoalignment film (1) had a thickness of 100 nm.

2. Formation of Liquid Crystal Cured Film

The composition for liquid crystal cured film formation (4) was applied to the surface of the photoalignment film (1) by a bar coating method, heat-dried in an oven at 120° C. for 1 minute, and then cooled to room temperature to give a dry film. The obtained dry film was exposed to ultraviolet radiation at an exposure dose of 1000 mJ/cm$^2$ (at 365 nm) using a UST irradiation device (SPOT CURE SP-7; manufactured by Ushio, Inc.) to give a liquid crystal cured film (5) cured with a polymerizable liquid crystal compound aligned in the direction horizontal to the substrate plane. The thickness of the formed liquid crystal cured film was measured by a laser microscope (OLS3000 manufactured by Olympus Corporation). The result was 2.2 μm.

4. Formation of Pressure-Sensitive Adhesive Layer

The pressure-sensitive adhesive side of the pressure-sensitive adhesive with a release film (5) was pressure-bonded to the surface of the liquid crystal cured film (5) to give an optically anisotropic sheet (3).

5. Retardation Measurement

The optically anisotropic sheet (3) was cut to a size of 30 mm×30 mm, and the release-film-removed side thereof was pressure-bonded to a glass substrate [Eagle XC name) manufactured by Corning Incorporated]. Subsequently, the substrate of the optically anisotropic: sheet was removed to give a measurement sample. The retardation values of the measurement sample were measured using a measuring device (KOBRA-WR manufactured by Oji Scientific Instruments) in a wavelength range of 450 to 700 nm. The retardation value Re(450) at a wavelength of 450 nm, the retardation value Re(550) at a wavelength of 550 nm, and the retardation value Re(650) at a wavelength of 650 nm were calculated by the program attached to the device. The results were as follows.

$Re(450)=118$ nm $Re(550)=139$ nm $Re(650)=142$ nm $Re(450)/Re(550)=0.85$ $Re(650)/Re(550)=1.02$

6. Transfer of Optically Anisotropic Film

The optically anisotropic sheet (3) was cut to a size of 25 mm×150 mm and, after the removal of the release film, pressure-bonded onto a glass substrate [Eagle XC (trade name) manufactured by Corning Incorporated]. Subsequently, the substrate of the optically anisotropic sheet (3) was removed to transfer an optically anisotropic film and a photoalignment film layer onto the glass. The thickness of the optically anisotropic film including the pressure-sensitive adhesive at this time was 12.3 μm.

The sticking force (F1) between the liquid crystal cured film and the pressure-sensitive adhesive layer was greater than the sticking force (F2) between the substrate and the alignment film and the sticking force (F2) between the alignment film and the liquid crystal cured film, and the above (F2) was the smallest. Accordingly, separation occurred between the alignment film and the liquid crystal cured film, and the substrate was removed. The sticking force (22) was 0.03 N/25 mm. That is, F2 and F3 were 0.02 N/25 ram or more, and F2 or F3 was less than 1 N/25 mm.

Example 11

1. Production of Circularly Polarizing Plate

The optically anisotropic sheet (3) obtained in Example 1 was cut to a size of 40 mm×40 mm and, after the removal of the release film, pressure-bonded to a reflection plate (a mirror-finished aluminum plate). Subsequently, the substrate of the optically anisotropic sheet was removed to transfer an optically anisotropic film (5) onto the glass. Further, the release film of the optically anisotropic sheet (2) obtained in Example 3 was removed, and the sheet was attached onto the optically anisotropic film (5) transferred onto the glass. The substrate of the optically anisotropic sheet was then removed to transfer an optically anisotropic film (2) onto the optically anisotropic film (5). At this time, the angle between the slow axis of the optically anisotropic film (5) and the absorption axis of the optically anisotropic film (2) was made 45°. Thus, an extremely thin circularly polarizing plate (6) having a total thickness, including the pressure-sensitive adhesive, of 24.0 μm was formed on the reflection plate.

2. Measurement of Reflectance

In order to confirm the usefulness of the circularly polarizing plate (6), reflectance was measured as follows. Using a spectrophotometer (UV-3150 manufactured by Shimadzu Corporation), light in a wavelength range of 400 to 700 nm was applied in 2 nm steps to the measurement sample at 12° from the normal direction, and the reflectance of the reflected light was measured. As a result of reflectance calculation taking the reflectance measured from a reflection plate disposed alone without the attachment of the circularly polarizing plate (6) as 100%, the reflectance of light in a wavelength range of 400 to 700 nm was about 1 to 10%, showing that sufficient antireflection characteristics can be obtained over the entire visible light range. This antireflection principle is the same as in external light reflection in a metal electrode of an organic EL display, and thus the circularly polarizing plate is also suitable for use in an organic EL display.

INDUSTRIAL APPLICABILITY

The optically anisotropic sheet of the present invention is useful for obtaining a thin optically anisotropic film.

What is claimed is:

1. An optically anisotropic sheet comprising a substrate, an alignment film, a liquid crystal cured film, and a sticky adhesive layer in this order, wherein
the alignment film is a film that has a thickness of 500 nm or less and is made of a polymer compound,
the liquid crystal cured film is a film that has a thickness of 3 μm or less and is cured with a polymerizable liquid crystal compound aligned in the direction horizontal to the plane of the substrate, and
the sticking force (F1) between the liquid crystal cured film and the sticky adhesive layer is greater than the sticking force (F2) between the substrate and the alignment film or the sticking force (F3) between the alignment film and the liquid crystal cured film,
F2 and F3 being 0.02 N/25 mm or more, F2 or F3 being less than 1 N/25 mm, wherein the liquid crystal cured film has wavelength dispersion characteristics that satisfy the following equations (1), (2), and (3):

$$Re(450)/Re(550) \leq 1.00 \quad (1)$$

$$1.00 \leq Re(650)/Re(550) \quad (2)$$

$$100 < Re(550) < 150 \quad (3)$$

wherein Re(450), Re(550), and Re(650) represent retardation at wavelengths of 450 nm, 550 nm, and 650 nm, respectively.

2. The optically anisotropic sheet according to claim 1, wherein the alignment film is a photoalignment film.

3. An optically anisotropic sheet comprising a substrate, a liquid crystal cured film, and a sticky adhesive layer in this order, wherein
the liquid crystal cured film is a film that has a thickness of 5 μm or less and is cured with a polymerizable liquid crystal compound aligned, and
the sticking force (F1) between the liquid crystal cured film and the sticky adhesive layer is greater than a substrate sticking force (F4), F4 being 0.02 N/25 mm or more and less than 1 N/25 mm,
wherein the liquid crystal cured film has wavelength dispersion characteristics that satisfy the following equations (1), (2), and (3):

$$Re(450)/Re(550) \leq 1.00 \quad (1)$$

$$1.00 \leq Re(650)/Re(550) \quad (2)$$

$$100 < Re(550) < 150 \quad (3)$$

wherein Re(450), Re(550), and Re(650) represent retardation at wavelengths of 450 nm, 550 nm, and 650 nm, respectively.

4. An optically anisotropic film comprising the optically anisotropic sheet of claim 3 with the substrate removed.

5. A method for producing a display device equipped with an optically anisotropic film, comprising attaching the optically anisotropic sheet of claim 3 to a display surface of a display device via the sticky adhesive layer, and then removing the substrate of the optically anisotropic sheet.

6. An optically anisotropic sheet comprising a substrate, a liquid crystal cured film, and a sticky adhesive layer in this order, wherein
the liquid crystal cured film is a film that has a thickness of 5 μm or less and is cured with a polymerizable liquid crystal compound aligned, and
the sticking force (F1) between the liquid crystal cured film and the sticky adhesive layer is greater than a substrate sticking force (F4), F4 being 0.02 N/25 mm or more and less than 1 N/25 mm,
wherein the liquid crystal cured film has a refractive index relation expressed by the following equation (4):

$$nz > nx \approx ny \quad (4)$$

wherein nz represents a refractive index in the thickness direction, nx represents a refractive index in the direction that gives the maximum refractive index in the plane, and ny represents a refractive index in the direction that is perpendicular to the direction of nx in the plane.

7. An optically anisotropic film comprising the optically anisotropic sheet of claim 6 with the substrate removed.

8. A circularly polarizing plate comprising a liquid crystal cured film, a sticky adhesive layer, a retardation film, and a sticky adhesive layer laminated in this order, wherein
the liquid crystal cured film is a film that has a thickness of 3 μm or less, is cured with a polymerizable liquid crystal compound aligned in the direction horizontal to the plane of the substrate, and contains a dichroic pigment.

9. The circularly polarizing plate according to claim 8, further comprising an alignment film on a surface of the liquid crystal cured film, wherein the alignment film is a film that has a thickness of 500 nm or less and is made of a polymer compound.

10. The circularly polarizing plate according to claim 8, wherein the sticky adhesive layer is a sticky adhesive layer formed from an active-energy-ray-curable adhesive.

11. An optically anisotropic sheet comprising a substrate, a liquid crystal cured film, and a sticky adhesive layer in this order, wherein
the liquid crystal cured film is a film that has a thickness of 5 μm or less and is cured with a polymerizable liquid crystal compound aligned, and
the sticking force (F1) between the liquid crystal cured film and the sticky adhesive layer is greater than a substrate sticking force (F4), F4 being 0.02 N/25 mm or more and less than 1 N/25 mm, wherein the liquid crystal cured film shows a Bragg peak in X-ray diffraction measurement.

12. The optically anisotropic sheet according to claim 11, wherein the liquid crystal cured film further contains a dichroic pigment.

13. The optically anisotropic sheet according to claim 12, wherein the dichroic pigment contains three or more kinds of azo compounds.

14. An optically anisotropic film comprising the optically anisotropic sheet of claim 11 with the substrate removed.

15. A method for producing a display device equipped with an optically anisotropic film, comprising attaching the optically anisotropic sheet of claim 11 to a display surface of a display device via the sticky adhesive layer, and then removing the substrate of the optically anisotropic sheet.

16. An optically anisotropic sheet comprising a substrate, a liquid crystal cured film, and a sticky adhesive layer in this order, wherein
the liquid crystal cured film is a film that has a thickness of 5 m or less and is cured with a polymerizable liquid crystal compound aligned, and
the sticking force (F1) between the liquid crystal cured film and the sticky adhesive layer is greater than a substrate sticking force (F4), F4 being 0.02 N/25 mm or more and less than 1 N/25 mm,
wherein the sticky adhesive layer is a sticky adhesive layer formed from an active-energy-ray-curable adhesive.

17. A circularly polarizing plate comprising a polarizing plate, a first sticky adhesive layer, a liquid crystal cured film, and a second sticky adhesive layer laminated in this order, wherein
the liquid crystal cured film is a film that has a thickness of 3 μm or less, is cured with a polymerizable liquid crystal compound aligned in the direction horizontal to the plane of the substrate, and has wavelength dispersion characteristics that satisfy the following equations (1), (2), and (3):

$$Re(450)/Re(550) \leq 1.00 \qquad (1)$$

$$1.00 \leq Re(650)/Re(550) \qquad (2)$$

$$100 < Re(550) < 150 \qquad (3)$$

wherein Re(450), Re(550), and Re(650) represent retardation at wavelengths of 450 nm, 550 nm, and 650 nm, respectively.

18. The circularly polarizing plate according to claim 17, further comprising an alignment film between the first sticky adhesive layer and the liquid crystal cured film, wherein the alignment film is a film that has a thickness of 500 nm or less and is made of a polymer compound.

19. The circularly polarizing plate according to claim 17, further comprising an alignment film between the liquid crystal cured film and the second sticky adhesive layer, wherein the alignment film is a film that has a thickness of 500 nm or less and is made of a polymer compound.

20. The circularly polarizing plate according to claim 17, wherein the first sticky adhesive layer is a sticky adhesive layer formed from an active-energy-ray-curable adhesive.

21. The circularly polarizing plate according to claim 17, wherein the second sticky adhesive layer is a sticky adhesive layer formed from an active-energy-ray-curable adhesive.

22. A display device equipped with an optically anisotropic film, comprising the circularly polarizing plate of claim 17.

23. A circularly polarizing plate comprising a first liquid crystal cured film, a first sticky adhesive layer, a second liquid crystal cured film, and a second sticky adhesive layer in this order, wherein
the first liquid crystal cured film is a film that has a thickness of 3 μm or less, is cured with a polymerizable liquid crystal compound aligned in the direction horizontal to the plane of the substrate, and contains a dichroic pigment,
the second liquid crystal cured film is a liquid crystal cured film that has a thickness of 3 μm or less, is cured with a polymerizable liquid crystal compound aligned in the direction horizontal to the plane of the substrate, and has wavelength dispersion characteristics that satisfy the following equations (1), (2), and (3):

$$Re(450)/Re(550) \leq 1.00 \qquad (1)$$

$$1.00 \leq Re(650)/Re(550) \qquad (2)$$

$$100 < Re(550) < 150 \qquad (3)$$

wherein Re(450), Re(550), and Re(650) represent retardation at wavelengths of 450 nm, 550 nm, and 650 nm, respectively.

24. The circularly polarizing plate according to claim 23, further comprising an alignment film between the first sticky adhesive layer and the second liquid crystal cured film, wherein the alignment film is a film that has a thickness of 500 nm or less and is made of a polymer compound.

25. The circularly polarizing plate according to claim 23, further comprising an alignment film on a surface of the first liquid crystal cured film, wherein the alignment film is a film that has a thickness of 500 nm or less and is made of a polymer compound.

26. The circularly polarizing plate according to claim 23, further comprising an alignment film on a surface of the first liquid crystal cured film and also between the sticky adhesive layer and the second liquid crystal cured film, wherein the alignment film is a film that has a thickness of 500 nm or less and is made of a polymer compound.

27. The circularly polarizing plate according to claim 23, wherein the first sticky adhesive layer is a sticky adhesive layer formed from an active-energy-ray-curable adhesive.

28. The circularly polarizing plate according to claim 23, wherein the second sticky adhesive layer is a sticky adhesive layer formed from an active-energy-ray-curable adhesive.

\* \* \* \* \*